(12) United States Patent
Wakatsuki et al.

(10) Patent No.: US 8,158,732 B2
(45) Date of Patent: Apr. 17, 2012

(54) METHOD FOR PREPARING CYCLIC OLEFIN ADDITION POLYMER OF HIGH GAS PERMEABILITY

(75) Inventors: Yasuo Wakatsuki, Shiki (JP); Hiroaki Tetsuka, Annaka (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 13/193,108

(22) Filed: Jul. 28, 2011

(65) Prior Publication Data

US 2012/0029158 A1   Feb. 2, 2012

(30) Foreign Application Priority Data

Jul. 30, 2010  (JP) .................. 2010-172689

(51) Int. Cl.
*C08F 4/609* (2006.01)
*C08F 4/70* (2006.01)
*C08F 30/08* (2006.01)

(52) U.S. Cl. ........ 526/131; 526/134; 526/145; 526/172; 526/279; 526/281

(58) Field of Classification Search .............. 526/131, 526/134, 145, 172, 279, 281
See application file for complete search history.

(56) References Cited

U.S. PATENT DOCUMENTS

| 5,344,900 | A | 9/1994 | Maezawa et al. |
| 5,569,730 | A | 10/1996 | Goodall et al. |
| 5,693,728 | A | 12/1997 | Okamoto et al. |
| 5,912,313 | A | 6/1999 | McIntosh, III et al. |
| 6,121,340 | A | 9/2000 | Shick et al. |
| 6,372,020 | B2 | 4/2002 | Hong et al. |
| 6,455,650 | B1 | 9/2002 | Lipian et al. |
| 6,521,731 | B2 | 2/2003 | Dershem et al. |
| 6,992,154 | B2 | 1/2006 | Oshima et al. |
| 7,449,540 | B2 | 11/2008 | Arai |
| 7,741,423 | B2 | 6/2010 | Arai |
| 7,910,674 | B2 | 3/2011 | Rhodes et al. |
| 2007/0155922 | A1 | 7/2007 | Ebata et al. |
| 2009/0292088 | A1 | 11/2009 | Oshima et al. |

FOREIGN PATENT DOCUMENTS

| DE | 41 28 932 A1 | 3/1993 |
| EP | 1 657 259 | 5/2006 |
| EP | 2 213 691 | 8/2010 |
| JP | 4-1652 | 1/1992 |
| JP | 4-63807 | 2/1992 |
| JP | 4-88004 | 3/1992 |
| JP | 5-262821 | 10/1993 |
| JP | 5-285216 | 11/1993 |
| JP | 7-196736 | 8/1995 |
| JP | 8-198881 | 8/1996 |
| JP | 8-198919 | 8/1996 |
| JP | 2001-79375 | 3/2001 |
| JP | 2003-252881 | 9/2003 |
| JP | 3476466 | 9/2003 |
| JP | 3534127 | 3/2004 |
| JP | 3801018 | 5/2006 |
| JP | 2007-70337 | 3/2007 |
| JP | 2007-77252 | 3/2007 |
| JP | 2007-291150 | 11/2007 |
| JP | 4075789 | 2/2008 |
| JP | 2008-202003 | 9/2008 |
| JP | 2009-173824 | 8/2009 |
| JP | 2009-249610 | 10/2009 |
| WO | WO 97/20871 A2 | 6/1997 |
| WO | WO 97/20871 A3 | 6/1997 |
| WO | WO 98/20394 A1 | 5/1998 |
| WO | WO 00/20472 A1 | 4/2000 |
| WO | WO 02/062859 A2 | 8/2002 |
| WO | WO 02/062859 A3 | 8/2002 |
| WO | WO 2007/069518 A1 | 6/2007 |

OTHER PUBLICATIONS

Machine translation of JP 2009-173824 A; pub. date: Aug. 2009.*
Jennifer Melia et al., "Pd(II)—Catalyzed Addition Polymerizations of Strained Polycyclic Olefins", Macromol. Symp., vol. 89, 1995, pp. 433-442.
Office Action issued Dec. 22, 2011, in Europe Patent Application No. 11175642.5-2109.
E. Sh. Finkelshtein, et al., "Addition-Type Polynorbornenes with $Si(CH_3)_3$ Side Groups: Synthesis, Gas Permeability, and Free Volume"; Macromolecules American Chemical Society, Jan. 1, 2006, vol. 39, No. 20, pp. 7022-7029, XP-002576350.
K. L. Makovetskii, "Catalytic Addition Polymerization of Norbornene and Its Derivatives and Copolymerization of Norbornene with Olefins", Polymer Science Series C, vol. 50, No. 1, Sep. 1, 2008, pp. 22-38, XP-55013987.

* cited by examiner

*Primary Examiner* — Fred M Teskin

(74) *Attorney, Agent, or Firm* — Oblon, Spivak, McClelland, Maier & Neustadt, L.L.P.

(57) ABSTRACT

A method for preparing a cyclic olefin addition polymer of high gas permeability, which method including subjecting a specific type of cyclic olefin-functional siloxane and a mixture thereof with a specific type of cyclic olefin compound to addition polymerization in the presence of a multi-component catalyst containing (A) a zero-valent palladium compound, (B) an ionic boron compound, and (C) a phosphine compound having a substituent group selected from an alkyl group having 3 to 6 carbon atoms, a cycloalkyl group and an aryl group, to obtain a cyclic olefin addition polymer of high gas permeability wherein a ratio of the structural units derived from the cyclic olefin-functional siloxane is at 10 to 100 mole % of the addition polymer and a number average molecular weight (Mn) ranges from 100,000 to 2,000,000.

7 Claims, 4 Drawing Sheets

METHOD FOR PREPARING CYCLIC OLEFIN ADDITION POLYMER OF HIGH GAS PERMEABILITY

CROSS-REFERENCE TO RELATED APPLICATION

This non-provisional application claims priority under 35 U.S.C. §119(a) on Patent Application No. 2010-172689 filed in Japan on Jul. 30, 2010, the entire contents of which are hereby incorporated by reference.

TECHNICAL FIELD

This invention relates to a cyclic olefin addition polymer and more particularly, to a method for preparing a cyclic olefin addition polymer of high gas permeability having a specific type of organosiloxane as a pendant.

BACKGROUND ART

In recent years, air conditioners, which provide comfortable living and working spaces, have become equipments essential not only for office buildings and residential houses, but also for carriage and transport vehicles such as automobiles, train cars, ships and vessels and airplanes. In general, the environment making use of an air conditioner is highly airtight so as to enhance an energy efficiency. Accordingly, if a human being continues to work in such an airtight space, the working efficiency lowers owing to the shortage of oxygen. Especially, with carriage and transport vehicles, there may be presented a problem on safety such as of causing drowsiness. Although the opening of window makes it possible to prevent an oxygen concentration from lowering, such opening will lead to an energy loss and permit pollen, yellow sand, dust to enter, thereby impeding the comfortable environment. Under such conditions, there have been developed air conditioners making use of an oxygen enriching film capable of selectively passing oxygen, with failure in realizing still a satisfactory performance.

Organopolysiloxanes are known as a material whose oxygen permeability is excellent. However, organopolysiloxanes per se are low in mechanical strength, presenting a problem in practical applications. To overcome this problem, there have been proposed copolymers with polycarbonates (Patent Document 1: JP-B H04-001652) and polysiloxane/aromatic polyamide-based block copolymers (Patent Document 2: JP-A H05-285216). However, these have problems in that not only their preparations are very complicated, but also long-term stability is lacked because of their susceptibility to hydrolysis.

Further, a variety of polymers having an organosilicon substituent have been proposed including, for example, silicon-containing styrene derivatives (Patent Document 3: JP-A H04-88004), silicon-containing stilbene derivatives (Patent Document 4: JP-A H08-198881), and silicon-containing celluloses (Patent Document 5: JP-A 2001-79375). Those polymers that are satisfactory with respect to oxygen permeability, thermal stability and mechanical strength have never been obtained yet.

In Patent Document 6 (JP-A 2007-291150), ring-opened polymers of cyclic olefin compounds having an organosiloxane as a pendant, and hydrides thereof, have been proposed. However, these polymers present problems on heat resistance and film strength in most cases, along with a problem in that they lack in long-term stability because of their capability of depolymerization.

With respect to the addition polymerization of cyclic olefin compounds, a number of proposals have ever been made (Patent Documents 7 to 22: JP-A H04-63807 and JP-A H08-198919, JP-A H09-508649, JP 3476466, JP-A H07-196736, WO 199720871, WO 199820394, JP 3801018, WO 2002062859, JP-A 2003-252881, DE-OS 4128932, JP-A 2007-77252 and JP-A 2007-70337, JP 4075789, WO 2007069518, and JP-A 2008-202003). However, no mention has been made of cyclic olefin-functional siloxanes as a monomer for addition polymerization reaction. As a matter of course, examples of addition polymers actually containing the siloxane as recurring units have never been reported.

In the just-mentioned Patent Documents 7 to 22, cyclic olefin addition polymers have been described in detail with respect to the development to applications for optical and electronic parts while taking particular note of thermal, dynamic, optical and electric properties thereof. Nevertheless, no report has been made on applications focused on the gas permeability.

Recently, addition polymers containing recurring units of cyclic olefin-functional siloxanes in the structure have been reported in Patent Document 23 (JP-A 2009-173824) and Patent Document 24 (JP-A 2009-249610). However, although the polymers set out in these applications exhibit excellent solubility, they do not have both mechanical strength and gas permeability enough to withstand practical applications. Especially, with the polymer proposed in the latter Patent Document 24, when the amount of an organosiloxane pendant imparting gas permeability to the polymer increases, mechanical strength significantly lowers. This is because when cyclic olefin-functional siloxanes are used as a monomer for addition polymerization reaction, there cannot be obtained polymers whose molecular weights are sufficient to ensure mechanical strength, suggesting that the preparation methods set forth in both Patent Documents 23 and 24 have some problems to solve.

The prior art documents are listed below.

| Citation List | |
|---|---|
| Patent Document 1: | JP-B H04-001652 |
| Patent Document 2: | JP-A H05-285216 |
| Patent Document 3: | JP-A H04-88004 |
| Patent Document 4: | JP-A H08-198881 |
| Patent Document 5: | JP-A 2001-79375 |
| Patent Document 6: | JP-A 2007-291150 |
| Patent Document 7: | JP-A H04-63807 |
| Patent Document 8: | JP-A H08-198919 |
| Patent Document 9: | JP-A H09-508649 |
| Patent Document 10: | JP 3476466 |
| Patent Document 11: | JP-A H07-196736 |
| Patent Document 12: | WO 199720871 |
| Patent Document 13: | WO 199820394 |
| Patent Document 14: | JP 3801018 |
| Patent Document 15: | WO 2002062859 |
| Patent Document 16: | JP-A 2003-252881 |
| Patent Document 17: | DE-OS 4128932 |
| Patent Document 18: | JP-A 2007-77252 |
| Patent Document 19: | JP-A 2007-70337 |
| Patent Document 20: | JP 4075789 |
| Patent Document 21: | WO 2007069518 |
| Patent Document 22: | JP-A 2008-202003 |
| Patent Document 23: | JP-A 2009-173824 |
| Patent Document 24: | JP-A 2009-249610 |
| Patent Document 25: | JP 3534127 |
| Patent Document 26: | WO 200020472 |
| Patent Document 27: | US 6455650 |
| Patent Document 28: | JP-A H05-262821 |
| Non-Patent Document 1: | Macromol. Symp. 89, 433-442 (1995) |

SUMMARY OF THE INVENTION

The invention has been made under these circumstances in the art and it is accordingly an object of the invention to provide a method for preparing a cyclic olefin addition polymer of high gas permeability having excellent gas permeability and high thermal stability and mechanical strength along with excellent solvent solubility with ease.

We have made intensive studies in order to achieve the above object and, as a result, found that a cyclic olefin addition polymer having a specific structure is obtained by subjecting, to addition polymerization, a cyclic olefin-functional siloxane of the formula (1) indicated below, or a mixture of this cyclic olefin-functional siloxane of the formula (1) and a cyclic olefin compound of the formula (2) indicated below in the presence of a specific type of multi-component catalyst containing the following compounds (A), (B) and (C), wherein the cyclic olefin addition polymer has a ratio of the structural units derived from the cyclic olefin-functional siloxane of the formula (1) of 10 to 100 mole % of the addition polymer and a number average molecular weight (Mn), as converted to polystyrene measured by GPC using tetrahydrofuran (hereinafter abbreviated as THF) as a solvent, in the range of 100,000 to 2,000,000, and exhibits excellent oxygen permeability, heat resistance, mechanical strength and solubility. The invention is based on this finding.

More particularly, according to a broad aspect of the invention, there is provided a method for preparing a cyclic olefin addition polymer having a high gas permeability and a number average molecular weight (Mn) of 100,000 to 2,000,000 as determined by gel permeation chromatography relative to polystyrene standards, comprising addition polymerizing a cyclic olefin-functional siloxane represented by the following formula (1), or a mixture of the cyclic olefin-functional siloxane of the formula (1) and a cyclic olefin compound represented by the following formula (2)

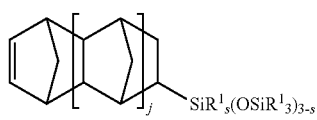

wherein $R^1$ may be the same or different and represents an aliphatic unsaturated bond-free monovalent organic group, s is an integer of 0 to 2 and j is 0 or 1,

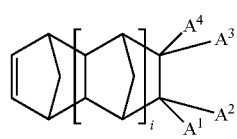

wherein $A^1$ to $A^4$ independently represent a group selected from a hydrogen atom, a halogen atom, an alkyl group having 1 to 10 carbon atoms, an alkenyl group, a cycloalkyl group, an aryl group, an alkoxy group, an aryloxy group and a halogenated hydrocarbon group, or a polar group selected from an oxetanyl group and an alkoxycarbonyl group provided that $A^1$ and $A^2$ or $A^1$ and $A^3$ may form a alicyclic structure, an aromatic ring structure, a carbonimide or an acid anhydride group along with the carbon atoms bonded therewith, and i is 0 or 1, in the presence of a multi-component catalyst containing (A) a zero-valent palladium compound, (B) an ionic boron compound, and (C) a phosphine compound having a substituent group selected from an alkyl group having 3 to 6 carbon atoms, a cycloalkyl group and an aryl group, thereby obtaining a cyclic olefin addition polymer wherein a ratio of the structural units derived from the cyclic olefin-functional siloxane of the formula (1) is at 10 to 100 mole % of the addition polymer.

In the method, it is preferred that the compound (A) is bis(dibenzylideneacetone)palladium that is a complex wherein two dibenzylideneacetone molecules are coordinated to one zero-valent palladium atom or tris(dibenzylideneacetone)dipalladium that is a complex wherein three dibenzylideneacetone molecules are coordinated to two zero-valent palladium atoms, the compound (B) is triphenylcarbeniumtetrakis(pentafluorophenyl)borate or lithium tetrakis(pentafluorophenyl)borate-ethyl ether complex, and the compound (C) is tricyclohexyl phosphine.

It is also preferred that $R^1$ in the formula (1) is a methyl group.

Preferably, $A^1$ to $A^4$ in the formula (2) independently represent a hydrogen atom and i is 0.

The addition polymerization is preferably carried out in an atmosphere of an inert gas under conditions of 0 to 150° C. and one to 72 hours.

It is preferred that the compound (A) is used in an amount of $1/1,000,000$ to $1/100$ mole, calculated as zero valent palladium, per mole of the total of the monomers of the formulas (1) and (2), the compound (B) is used in an amount of 1.0 to 2.0 moles per mole of the compound (A), and the compound (C) is used in an amount of 0.25 to 2.0 moles per mole of the compound (A).

It is also preferred that the addition polymerization is carried out in a solvent wherein a ratio by weight between an amount S of the solvent and a total amount M of the cyclic olefin monomers consisting of the compounds of the formulas (1) and (2), indicated by S/M, is within a range of 0.1 to 30.

ADVANTAGEOUS EFFECTS OF THE INVENTION

According to the invention, there can be easily prepared a polymer by vinyl addition polymerization of cyclic olefins in the presence of a specific type of multi-component catalyst. The resulting polymer has excellent gas permeability, particularly, excellent oxygen permeability, along with high thermal stability (heat resistance) and film strength (mechanical strength) and excellent solubility in organic solvents.

DESCRIPTION OF THE EMBODIMENTS

Figure 1:
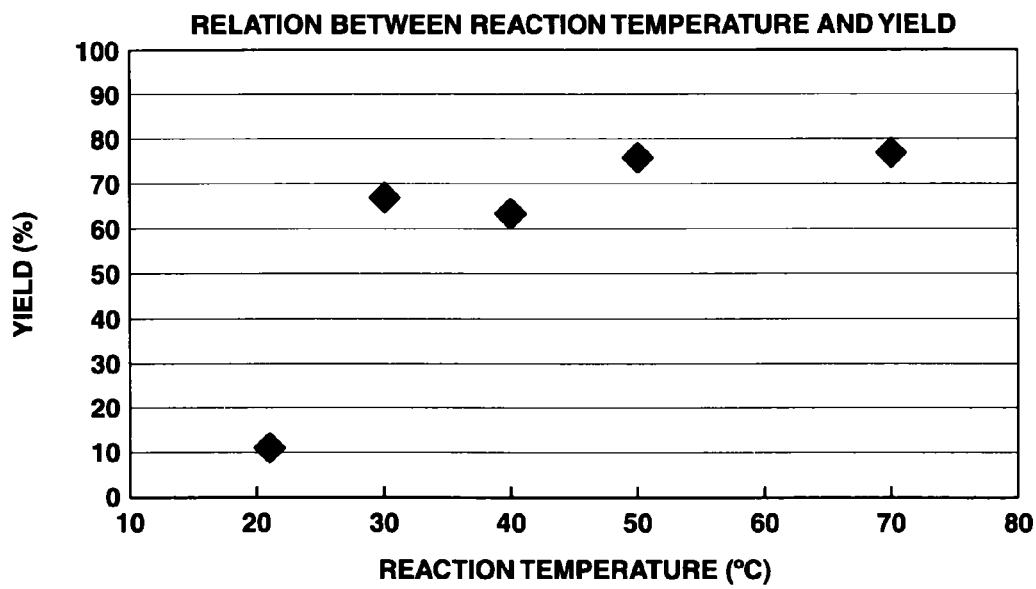
FIG. 1 is a graph showing the relation between the reaction temperature and the yield for the polymers obtained in Examples 1 to 5.

The cyclic olefin addition polymer of high gas permeability according to the invention is obtained by addition polymerizing a cyclic olefin-functional siloxane represented by the formula (1), or the cyclic olefin-functional siloxane of the formula (1) and a cyclic olefin compound of the formula (2) in the presence of a multi-component catalyst containing the following compounds (A), (B) and (C):

Compound (A) is a zero-valent palladium compound;
Compound (B) is an ionic boron compound; and
Compound (C) is a phosphine compound having a substituent group selected from an alkyl group having 3 to 6 carbon atoms, a cycloalkyl group and an aryl group.

As a conventional addition polymerization catalyst for cyclic olefin compounds, mention is made of transition metal complexes whose central metals are selected from the elements of Groups 8, 9 and 10 of the periodic table and include, for example, iron (Fe), cobalt (Co), nickel (Ni), ruthenium (Ru), rhodium (Rh), palladium (Pd) and platinum (Pt). In order to obtain the cyclic olefin addition polymer of the invention having many excellent physical properties, however, it is essential that reactivity on the cyclic olefin-functional siloxane represented by the formula (1) be high and that the resulting polymer be a high molecular weight product. From this point of view, it is necessary to use, in combination, a compound (A) having palladium as a central metal and a specific type of ligand, an ionic boron compound (B) and a phosphine compound (C).

Further, the compound (A) whose central metal is palladium needs to be a zero-valent palladium compound. As stated hereinafter, the cyclic olefin addition polymer of the invention is characterized by being prepared based on the excellent polymerization activity and molecular weight control function resulting from the use of a zero-valent palladium compound.

Hitherto reported palladium compounds for cyclic olefin addition polymerization (see Patent Documents 7 to 24) all make use of divalent palladium, and cyclic olefin addition polymerization making use of a zero-valent palladium compound has never been reported. In the Patent Document 25, although some zero-valent palladium compounds are exemplified, they are merely exemplified and no description is made on their practical applications. In Patent Document 26, only one example of polymerization using a bis(tricyclohexyl-phosphine)palladium compound is set out in Example 289. However, no mention is made of not only the yield of the resulting polymer, but also the molecular weight thereof. These facts show that the excellent performance of a multi-component catalyst made up of (A) a zero-valent palladium compound, (B) an ionic boron compound and (C) a phosphine compound as described in detail hereinafter has never been found in prior art.

Compound (A)

The compound (A) contains, as a central metal, palladium that is an element of Group 10 of the periodic table and is particularly a zero-valent palladium compound. Specific examples include bis(dibenzylideneacetone)palladium that is a complex made of two dibenzylideneacetone molecules or 1,5-diphenyl-1,4-pentadien-3-on, which may be sometimes abbreviated as aba) coordinated to one zero-valent palladium atom, tris(dibenzylideneacetone)dipalladium that is a complex made of three dibenzylideneacetone molecules coordinated to two zero-valent palladium atoms, (ethene)bis(tricyclohexyl-phosphine)palladium that is a complex made of one ethylene unit and two tricyclohexylphosphine groups coordinated to one zero-valent palladium atom, carbonyltris(triphenylphosphine)-palladium that is a complex made of one carbon monoxide unit and three triphenylphosphine groups coordinated to one zero-valent palladium atom, bis(t-butylisocyanide)palladium that is a complex made of two t-butyl-isocyanide groups coordinated to one zero-valent palladium atom, and the like. Of these, taking the ease in handling, availability and stability of the complex into consideration, bis(dibenzylideneacetone)palladium and tris(dibenzylideneacetone)dipalladium are preferred.

Compound (B)

The compound (B) is an ionic boron compound. Specific examples include triphenylcarbeniumtetrakis(pentafluorophenyl)borate, triphenylcarbeniumtetrakis[3,5-bis(trifluoromethyl)phenyl]borate, N,N-dimethylaniliniumtetrakis-(pentafluorophenyl)borate and a lithium tetrakis(pentafluorophenyl)borate-ethyl ether complex. Of these, triphenylcarbeniumtetrakis(pentafluorophenyl)borate and a lithium tetrakis(pentafluorophenyl)borate-ethyl ether complex are preferred when taking the solubility in organic solvents and the ease in availability into consideration.

Compound (C)

The compound (C) is a phosphine compound having a substituent group selected from an alkyl group having 3 to 6 carbon atoms, a cycloalkyl group and an aryl group. Specific examples include triisopropyl phosphine, tri-t-butyl phosphine, tricyclopentyl phosphine, tricyclohexyl phosphine, triphenyl phosphine, di-t-butylphenyl phosphine and the like. Of these, tricyclohexyl phosphine is preferred because of the satisfaction of both of catalytic activity and stability.

According to a preferred embodiment of the invention, the cyclic olefin addition polymer of high gas permeability is prepared by using, as compound (A), bis(dibenzylideneacetone)-palladium or tris(dibenzylideneacetone)dipalladium, as compound (B), triphenylcarbeniumtetrakis(pentafluorophenyl)-borate or a lithium tetrakis(pentafluorophenyl)borate-ethyl ether complex, and as compound (C), tricyclohexyl phosphine.

More preferred embodiments are just as described below.

i. Compound (A) is bis(dibenzylideneacetone)palladium that is a complex made of two dibenzylideneacetone molecules coordinated to one zero-valent palladium atom, compound (B) is triphenylcarbeniumtetrakis(pentafluorophenyl)borate, and compound (C) is tricyclohexyl phosphine.

ii. Compound (A) is bis(dibenzylideneacetone)palladium that is a complex made of two dibenzylideneacetone molecules coordinated to one zero-valent palladium atom, compound (B) is a lithium tetrakis(pentafluorophenyl)borate-ethyl ether complex, and compound (C) is tricyclohexyl phosphine.

iii. Compound (A) is tris(dibenzylideneacetone)dipalladium that is a complex made of three dibenzylideneacetone molecules coordinated to two zero-valent palladium atoms, compound (B) is triphenylcarbeniumtetrakis(pentafluorophenyl)borate, and compound (C) is tricyclohexyl phosphine.

iv. Compound (A) is tris(dibenzylideneacetone)dipalladium that is a complex made of three dibenzylideneacetone molecules coordinated to two zero-valent palladium atoms, compound (B) is a lithium tetrakis(pentafluorophenyl)-borate-ethyl ether complex, and compound (C) is tricyclohexyl phosphine.

The cyclic olefin addition polymer of high gas permeability according to the invention is prepared by addition polymerization of a cyclic olefin-functional siloxane represented by the following formula (1), or the cyclic olefin-functional siloxane of the formula (1) and a cyclic olefin compound represented by the following formula (2) in the presence of the multi-component catalyst made of the above compounds (A), (B) and (C)

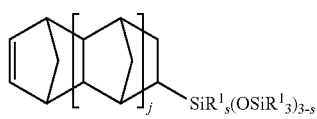

(1)

wherein $R^1$ may be the same or different and represents an aliphatic unsaturated bond-free monovalent organic group, s is an integer of 0 to 2, and j is 0 or 1,

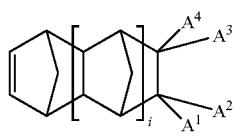

(2)

wherein $A^1$ to $A^4$ independently represent a group selected from a hydrogen atom, a halogen atom, an alkyl group having 1 to 10 carbon atoms, an alkenyl group, a cycloalkyl group, an aryl group, an alkoxy group, an aryloxy group and a halogenated hydrocarbon group, or a polar group selected from an oxetanyl group and alkoxycarbonyl group provided that $A^1$ and $A^2$ or $A^1$ and $A^3$ may form an alicyclic structure, an aromatic ring structure, a carbonimide group or an acid anhydride group along with the carbon atoms joined therewith, and i is 0 or 1.

In the above formula (1), $R^1$ may be the same or different and represents an aliphatic unsaturated bond-free monovalent organic group, preferably an unsubstituted or substituted monovalent hydrocarbon group having 1 to 10 carbon atoms, e.g., an alkyl group such as a methyl group, an ethyl group, an n-propyl group, a butyl group, a pentyl group or the like, an aryl group such as a phenyl group, a tolyl group, a xylyl group or the like, an aralkyl group such as a benzyl group, a 2-phenylethyl group, a 3-phenylpropyl group or the like, or a group wherein one or more of the hydrogen atoms of the above-indicated groups are replaced by a halogen atom such as a fluorine atom, a chlorine atom, a bromine atom or the like.

As the cyclic olefin-functional siloxane represented by the formula (1), the following compounds can be exemplified although not limited to these specific examples in the practice of the invention. In the formulas, Me represents a methyl group and Ph represents a phenyl group (Me and Ph, respectively, have the same meanings whenever they appear hereinafter).

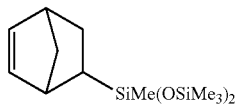 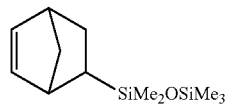

-continued

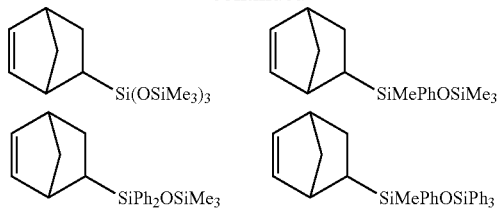

The cyclic olefin-functional siloxanes of the formula (1) may be used singly or in combination of two or more.

The cyclic olefin-functional siloxane of the formula (1) wherein $R^1$ is a methyl group, j=0 and s=0, for example, can be prepared according to the following procedures.

In the first procedure, the siloxane can be prepared according to the Diels-Alder reaction between a siloxane having a terminal olefin and dicyclopentadiene as shown in the following reaction formula.

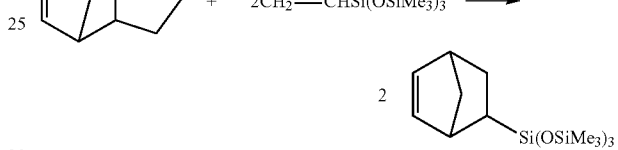

In the second procedure, there can be employed the addition reaction between norbornadiene and a corresponding SiH group-containing functional siloxane in the presence of a platinum catalyst.

In the above formula (2), $A^1$ to $A^4$ independently represent a group selected from a hydrogen atom, a halogen atom such as a fluorine atom, a chlorine atom, a bromine atom or the like, an alkyl group having 1 to 10 carbon atoms such as a methyl group, an ethyl group, a propyl group, an isopropyl group, a butyl group, an isobutyl group, a tert-butyl group, a pentyl group, a neopentyl group, a hexyl group, an octyl group, a nonyl group, a decyl group or the like, an alkenyl group such as a vinyl group, an allyl group, a butenyl group, a hexenyl group or the like, a cycloalkyl group such as a cyclohexyl group or the like, an aryl group such as a phenyl group, a tolyl group, xylyl group, a naphthyl group or the like, an alkoxy group such as a methoxy group, an ethoxy group, a propoxy group or the like, an aryloxy group such as a phenoxy group or the like, and a halogenated hydrocarbon group such as a 3,3,3-trifluoropropyl group, a 2-(perfluorobutyl)ethyl group, a 2-(perfluorooctyl)ethyl group, a p-chlorophenyl group or the like, or a polar substituent group selected from an oxetanyl group and an alkoxycarbonyl group whose alkoxy moiety preferably has 1 to 10 carbon atoms, more preferably 1 to 6 carbon atoms, such as a methoxycarbonyl group, a tert-butoxycarbonyl group or the like. Additionally, $A^1$ and $A^2$ or $A^1$ and $A^3$ may form an alicyclic structure, an aromatic ring structure, a carbonimide group or an acid anhydride along with the carbon atoms bonded thereto.

In this case, the alicyclic structure in the formula (2) includes ones having 4 to 10 carbon atoms, and the aromatic ring structure includes ones having 6 to 12 carbon atoms. Examples of these structures are those indicated below.

Alicyclic ring structures:

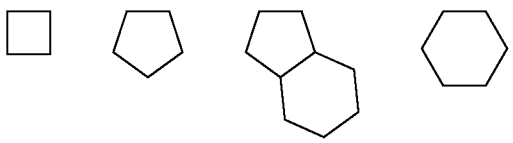

Aromatic ring structure:

Carbonimide groups:

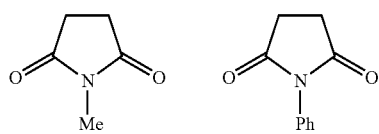

Acid anhydride group:

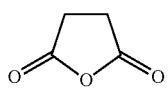

It will be noted that examples of these structures or groups bonded with a norbornene ring are those indicated below wherein i=0 in the formula (2).

Alicyclic ring structures:

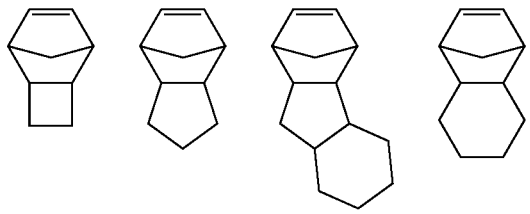

Aromatic ring structure:

Carbonimide groups:

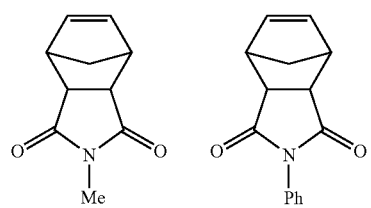

Acid anhydride group:

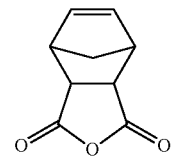

The cyclic olefin compounds represented by the formula (2) include those indicated below although the invention is not limited thereto.

Specific examples include bicyclo[2.2.1]hept-2-ene, 5-methyl-bicyclo[2.2.1]hept-2-ene, 5-ethyl-bicyclo[2.2.1]hept-2-ene, 5-propyl-bicyclo[2.2.1]hept-2-ene, 5-butyl-bicyclo[2.2.1]hept-2-ene, 5-pentyl-bicyclo[2.2.1]hept-2-ene, 5-hexyl-bicyclo[2.2.1]hept-2-ene, 5-octyl-bicyclo[2.2.1]hept-2-ene, 5-decyl-bicyclo[2.2.1]hept-2-ene, 5-phenyl-bicyclo[2.2.1]hept-2-ene, 5-vinyl-bicyclo[2.2.1]hept-2-ene, 5-allyl-bicyclo[2.2.1]hept-2-ene, 5-isopropylidene-bicyclo[2.2.1]hept-2-ene, 5-cyclohexyl-bicyclo[2.2.1]hept-2-ene, 5-fluoro-bicyclo[2.2.1]hept-2-ene, 5-chloro-bicyclo[2.2.1]hept-2-ene, methyl bicyclo[2.2.1]hept-5-ene-2-carboxylate, ethyl bicyclo[2.2.1]hept-5-ene-2-carboxylate, butyl bicyclo[2.2.1]hept-5-ene-2-carboxylate, methyl 2-methyl-bicyclo[2.2.1]hept-5-ene-2-carboxylate, ethyl 2-methyl-bicyclo[2.2.1]hept-5-ene-2-carboxylate, propyl 2-methyl-bicyclo[2.2.1]hept-5-ene-2-carboxylate, trifluoroethyl 2-methyl-bicyclo[2.2.1]hept-5-ene-2-carboxylate, ethyl 2-methyl-bicyclo[2.2.1]hept-2-enylacetate, 2-methyl-bicyclo[2.2.1]hept-5-enyl acrylate, 2-methyl-bicyclo[2.2.1]hept-5-enyl methacrylate, dimethyl bicyclo[2.2.1]hept-5-ene-2,3-dicarboxylate, tricyclo[4.3.0.1$^{2,5}$]deca-3-ene, tetracyclo[4.4.0.1$^{2,5}$.1$^{7,10}$]dodeca-3-ene and the like.

These may be used singly or in combination of two or more.

It is preferred from the standpoint of heat resistance and oxidative degradation of the resulting polymer that the cyclic olefin compound represented by the formula (2) does not contain an unsaturated bond in the structure thereof. With the case of addition polymerization of an unsaturated bond-containing compound such as 5-vinyl-bicyclo[2.2.1]hept-2-ene, the carbon-carbon double bond at the side chain of the resulting polymer should preferably be subjected to hydrogenation or hydrosilylation because the heat resistance and oxidation degradation can be improved.

If the cyclic olefin compound represented by the formula (2) contains a polar group such as an ester group, the resulting polymer is enhanced in adhesion to an adherend or solubility in organic solvent, but with a tendency to lower gas permeability. Accordingly, proper selection depending on the purpose is favorable.

The charge ratio between the cyclic olefin-functional siloxane of the formula (1) and the cyclic olefin compound of the formula (2) is preferably used in such a way that while taking gas permeability of the resulting cyclic olefin addition polymer of the invention into consideration, the structural units derived from the compound of the formula (1) in the polymer are within a range of 10 to 100 mole %, more preferably 20 to 100 mole %.

The compounds (A), (B) and (C) of the multi-component catalyst are used in such ranges indicated below, respectively.

The compound (A) is preferably in the range of 1/1,000,000 to 1/100 mole, in terms of zero-valent palladium, per mole of the total of the monomers of the formulas (1) and (2), more preferably 1/100,000 to 1/1,000 mole. If the compound (A) is used in greater amounts, there may not be obtained a polymer of an intended molecular weight. A smaller amount may lead to a lowering of polymerization activity in some case.

The compound (B) is preferably at 1.0 to 2.0 moles per mole of the compound (A), more preferably 1.0 to 1.5 moles. A larger amount of the compound (B) may leave it in the resulting polymer with some possibility of coloration. A smaller amount may lower polymerization activity.

The compound (C) is preferably at 0.25 to 2.0 moles per mole of the compound (A), more preferably at 0.5 to 1.5 moles. A larger amount of the compound (C) may lower polymerization activity, and a smaller amount may lower the stability of the catalyst.

The cyclic olefin addition polymer of high gas permeability of the invention can be prepared by polymerization in the presence of a multi-component catalyst made of the compounds (A), (B) and (C) set out hereinabove in one or more solvents selected from alicyclic hydrocarbon solvents such as cyclohexane, cyclopentane and the like, aliphatic hydrocarbon solvents such as hexane, octane and the like, aromatic hydrocarbon solvents such as toluene, benzene, xylene and the like, halogenated hydrocarbon solvents such as dichloromethane, tetrachloroethylene, chlorobenzene and the like, and cyclic polysiloxane solvents such as octamethylcyclotetrasiloxane, decamethylcyclopentasiloxane and the like.

The amount of the solvent is within a range of 0.1 to 30, preferably 1 to 20, when expressed as a ratio (S/M) by weight of the solvent (S) to the cyclic olefin monomers (M) (the total amount of the compounds of the above formulas (1) and (2)). If the amount of the solvent is smaller than the above ratio, the solution viscosity becomes high with the possibility that a difficulty is involved in handling. On the other hand, when the amount exceeds the above ratio, polymerization activity may become poor.

Where the multi-component catalyst made of the compounds (A), (B) and (C) are mixed by contact with the cyclic olefin monomers, several operation procedures are possible including operation procedure 1 wherein a solution of the compound (A) dissolved in such a solvent as mentioned above is charged into and mixed with a solution composed of the compounds (B) and (C), cyclic olefin monomers and a solvent of the type indicated above, operation procedure 2 wherein a solution of the compounds (A) and (C) dissolved in a solvent of the type indicated above is charged into and mixed with a solution composed of the compound (B), cyclic olefin monomers and a solvent as used above, and operation procedure 3 wherein a solution of the compounds (A), (B) and (C) dissolved in a solvent of the type indicated above is charged into and mixed with a solution of cyclic olefin monomers and a solvent as used above. From the standpoint of permitting efficient generation of catalytic activity species, the operation procedure 3 is preferred.

In the preparation of the cyclic olefin addition polymer of the invention, the reaction temperature is important. This is because where the multi-component catalyst made of the compounds (A), (B) and (C) is used, the molecular weight of the resulting cyclic olefin addition polymer of the invention can be appropriately controlled depending on the reaction temperature.

For the method of controlling the molecular weight of cyclic olefin addition polymers using catalysts of palladium compounds, there have been known in the past those methods including:

1) a method of conversion to low molecular weight products by increasing the amount of a catalyst (see Non-Patent Document 1);
2) a method of adding an α-olefin compound as a molecular weight controlling agent (see Patent Document 10);
3) a method of adding cyclopentene as a molecular weight controlling agent (see Patent Document 27);
4) a method of adding ethylene as a molecular weight controlling agent (see Patent Document 20); and
5) a method of adding hydrogen as a molecular weight controlling agent (see Patent Document 28).

However, the above method 1) needs a large amount of a catalyst and has a problem in costs and removal of the catalyst from the resulting polymer. The controlling mechanism of the molecular weight in the methods 2) and 3) is such that an α-olefin or cyclopentene is introduced into a polymer terminal, followed by subsequent n-hydrogen separation. In general, this effect of a palladium catalyst is small and thus, a large amount thereof has to be added. With the methods 4) and 5), many industrial problems are involved because it is essential to introduce gases, such as ethylene and hydrogen, which are difficult in handling, and polymerization activity lowers although depending on the feeding pressure. Although it has been reported as a general procedure that the molecular weight is controlled by a polymerization temperature, such a controlling effect is small when using hitherto known palladium catalysts. Additionally, it has never been reported to clearly show the effect per se. More particularly, it would be quite surprised and interested to find out that the molecular weight of a cyclic olefin addition polymer of the invention can be controlled by the reaction temperature by using the multi-component catalyst composed of the compounds (A), (B) and (C).

It is preferred that the polymerization method includes charging starting monomers in a reaction container according to any of the above-stated operation procedures in an atmosphere of an inert gas such as nitrogen, argon or the like and polymerizing at a temperature ranging 0 to 150° C., preferably 20 to 100° C. for a time of 1 to 72 hours, preferably 2 to 48 hours. In this regard, however, when the reaction temperature is too low, polymerization activity may become poor. Too high a temperature may cause gelation, with some difficulty in controlling the molecular weight.

Where the multi-component catalyst made of the compounds (A), (B) and (C) is used, no molecular weight controlling agent is needed, but a molecular weight controlling effect may be enhanced when the agent is used together. As such a molecular weight controlling agent, mention is made of hydrogen, an α-olefin such as ethylene, butene, 1-hexene, 1-octene or the like, a cycloalkene such as cyclopentene, cyclooctene or the like, an aromatic vinyl compound such as styrene, 3-methylstyrene, divinylbenzene or the like, and a vinyl silicon compound such as tris(trimethylmethoxy)vinylsilane, divinyldihydrosilane, vinyl cyclotetrasiloxane or the like.

It is difficult to generally determine a ratio of the solvent and the monomer, polymerization temperature and polymerization time. They should be properly used depending on the purpose in obtaining a polymer having a specific type of structure.

The termination of the polymerization is feasible by use of a compound selected from water, an alcohol, a ketone, an organic acid and the like. When a mixture of water and alcohol with an acid such as lactic acid, malic acid, oxalic acid or the like is added to a polymer solution, the residue of a catalyst can be separated and removed from the polymer solution. For the removal of the catalyst residue, there may be applied removal by adsorption with active carbon, diatomaceous earth, alumina, silica or the like or removal by filtration separation with a filter.

The polymer can be obtained by coagulation by placing the polymer solution in an alcohol such as methanol, ethanol or the like or in a ketone such as acetone, methyl ethyl ketone or the like, and drying under reduced pressure at 60 to 150° C. for 6 to 48 hours. In this procedure, the catalyst residue and unreacted monomers left in the polymer solution are removed as well. The siloxane-containing unreacted monomers used in the invention can be readily removed by use of a mixed solvent of such an alcohol or ketone as indicated above and a cyclic polysiloxane such as octamethylcyclotetrasiloxane, decamethylcyclopentasiloxane or the like.

The thus obtained cyclic olefin addition polymer of the invention contains recurring units of the following formula (3), which are formed by addition polymerization of a cyclic olefin-functional siloxane monomer of the afore-indicated formula (1)

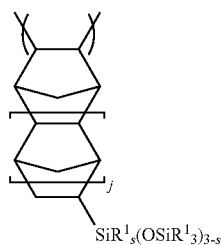

(3)

wherein $R^1$, s and j, respectively, have the same meanings as defined in the formula (1).

When using the cyclic olefin compound of the formula (2), the cyclic olefin addition polymer of the invention contains recurring units of the following formula (4), which are formed by addition polymerization of a cyclic olefin compound of the afore-indicated formula (2) as a monomer

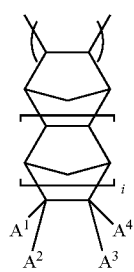

(4)

wherein $A^1$ to $A^4$ and i, correspondingly, have the same meanings as defined in the formula (2).

Although the recurring units represented by the formula (4) indicate 2,3-addition structural units when i is 0 and $A^1$ to $A^4$ are all a hydrogen atom, 2,7-addition structural units, which are formed by addition polymerization of the cyclic olefin compound of the formula (2) as a monomer, may also be contained. These structural units are true of the recurring units represented by the formula (3).

The ratio of the structural units of the formula (3) in the cyclic olefin addition polymer of high gas permeability of the invention is generally at 10 to 100 mole %, preferably at 20 to 100 mole %. If the ratio of the structural units of the formula (3) is less than 10 mole %, gas permeability becomes unsatisfactory. Especially, it is preferred from the standpoint of gas permeability, solubility in organic solvent and mechanical strength that the structural units derived from the compound of the formula (1) are contained at 20 to 100 mole % and the structural units derived from the compound of the formula (2) are contained at 0 to 80 mole %, each based on the cyclic olefin compounds. If the structural units derived from the compound of the formula (2), i.e., the structural units of the formula (4) are present, the amount thereof is at least 0.1 mole %.

The structural units represented by the formulas (3) and (4) may exist randomly or may be located in a blockwise manner in the cyclic olefin addition polymer of high gas permeability of the invention.

The molecular weight of the cyclic olefin addition polymer of the invention is an important factor taking part in development of excellent physical properties. The number average molecular weight (Mn), which is measured by gel permeation chromatography (GPC) using a THS solvent relative to polystyrene, is at 100,000 to 2,000,000, preferably at 150,000 to 1,500,000. The ratio (dispersity: Mw/Mn) between the weight average molecular weight (Mw) and the number average molecular weight (Mn) is preferably within a range of 1.0 to 6.0, more preferably 1.0 to 5.5. If the number average molecular weight is less than 100,000, the resulting polymer become brittle and are liable to crack when formed as a thin film, film and sheet. Thus, film strength withstanding practical use is not obtained. On the other hand, when the number average molecular weight exceeds 2,000,000, molding processability and solubility in solvents become lower or a solution viscosity becomes high, resulting in poor handleability. If the ratio (Mw/Mn) between the weight average molecular weight (Mw) and the number average molecular weight (Mn) exceeds 6.0, there may be some case where the resulting polymer degrades with respect to the cracking and brittleness. In the practice of the invention, when using a multi-component catalyst made of the compounds (A), (B) and (C), there can be easily obtained a cyclic olefin addition polymer whose molecular weigh distribution is so narrow that the number average molecular weight (Mn) is at 100,000 to 2,000,000 and the ratio (Mw/Mn) between the weight average molecular weight (Mw) and the number average molecular weight (Mn) is within a range of 1.0 to 6.0. This eventually leads to excellent resistances to cracking and brittleness upon formation into a coating film or a thin film such as a film or sheet.

The glass transition temperature of the cyclic olefin addition polymer of the invention is measured by use of TMS (thermal mechanical analysis). The glass transition temperature evaluated in this way is preferably at 200 to 400° C., more preferably at 220 to 380° C. If the glass transition temperature is lower than 200° C., there is the possibility of causing a problem of thermal deformation when processing or using a molded body containing the cyclic olefin addition polymer of the invention. When the glass transition temperature exceeds 400° C., thermal processing has to be carried out at too high a temperature, with the possibility that the molded body containing the cyclic olefin addition polymer of the invention undergoes thermal degradation.

The structure of the cyclic olefin addition polymer of the invention can be confirmed according to nuclear magnetic resonance spectra ($^1$H-NMR, $^{29}$Si-NMR). For instance, the structure can be confirmed, in the $^1$H-NMR analyses (in deuterated chloroform), from an absorption ascribed to —$C_6H_5$ of —O—Si($C_6H_5$)—O— at 7.8 to 6.5 ppm, an absorption derived from an alicyclic hydrocarbon at 0.6 to 3.0 ppm, absorptions ascribed to —$S_1$—$CH_2$—, —Si—CH, and —O—$S_1$—$CH_3$ at 0.0 to 0.6 ppm, and an absorption ascribed to —O—Si—($CH_3$)—O— at −0.1 to 0.0 and, in the $^{29}$Si-NMR analyses (in deuterated benzene), from an absorption derived from M unit (R³: methyl group, 10.0 to 5.0 ppm), an absorption derived from D unit (R³: methyl group, −15.0 to 25.0 ppm, R³: phenyl group, −45.0 to −50.0 ppm) and an absorption derived from T unit (R³: alkyl group, −65.0 to −70.0), all units being indicated in the following formula (5) along with integration ratios thereof.

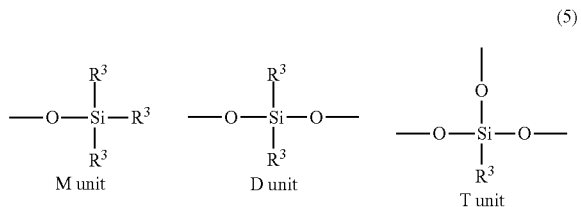

(5)

R³ has the same meaning as R¹ in the formula (1).

The cyclic olefin addition polymer of high gas permeability of the invention is preferably used in the form of a thin film, a sheet or a film. The thickness of the thin film, sheet or film is not critical and is generally adjusted in the range of 10 nm to 3 mm depending on the purpose. The manner of forming a thin film, sheet or film is not specifically limited and the formation is feasible by an arbitrary method. From the standpoint of suppressing the polymer from degradation by thermal history, it is preferred to form them by a solution casting method (cast method) wherein the polymer of the invention is dissolved in a solvent and coated onto a support, followed by drying the coating, a water surface casting method for thin film wherein a polymer solution of the invention is dropped over a water surface and scooped such as with a support, or a dry-wet phase conversion method wherein a polymer of the invention is dissolved in a solvent and coated onto a support, followed by immersing in a poor solvent.

The solvents used in the solution casting method, water surface casting method and dry-wet phase conversion method should be ones that are able to dissolve the addition polymer of the invention. Most of the addition polymers of the invention are dissolved in aliphatic hydrocarbon solvents such as cyclopentane, hexane, cyclohexane, decane, isododecane and the like, aromatic hydrocarbon solvents such as toluene, xylene, ethylbenzene and the like, halogenated hydrocarbon solvents such as dichloromethane, chloroform and the like, and polysiloxane solvents such as hexamethyldisiloxane, methyltris(trimethylsiloxy)silane, decamethylcyclopentasiloxane and the like. These solvents may be used singly or as a mixed solvent of two or more. Although the cyclic olefin addition polymer of the invention shows excellent solubility in any of the above-indicated solvents, a residual solvent may not be removed when dried although depending on the film thickness or coating conditions. Accordingly, it is preferred to use solvents that contain, as a main component, hexane, cyclohexane, toluene and the like whose boiling points are relatively low.

The oxygen permeation coefficient of the cast film of the cyclic olefin addition polymer of the invention formed according to the above-stated procedure is measured by use of a differential-pressure method. The oxygen permeation coefficient of the cyclic olefin addition polymer cast film evaluated in this way is preferably at not less than 40 Barrers (1 Barrer=$10^{-10}$ cm³(STP)·cm/cm²·second·cmHg), more preferably at not less than 50 Barrers (1 Barrer=$10^{-10}$ cm³(STP)·cm/cm²·second·cmHg). If the oxygen permeation coefficient is less than 40 Barrers (1 Barrer= $10^{-10}$ cm³(STP)·cm/cm²·second·cmHg), there may be some case where a satisfactory oxygen transport performance is not obtained.

Since the cyclic olefin addition polymer of high gas permeability according to the invention contains a high ratio of the structural units of the formula (3) that correspond to the structural units derived from the monomer of the formula (1), it shows high solubility in an isododecane solvent or a polysiloxane solvent such as methyltris(trimethylsiloxy)silane, decamethylcyclopentasiloxane or the like. It is known that the influence of these solvents on the human body and environmental load is small and thus, the solvents are of high safety. This enables the addition polymer to be applicable to medical, food and cosmetic fields where applications of existing cyclic olefin addition polymers (see Patent Documents 7 to 22) would be difficult. In the applications of these fields, the solubility in an isododecane solvent or siloxane solvent is preferably not less than 10 wt %, more preferably 30 wt %. If the solubility is less than 10 wt %, there is concern that a film after coating becomes thin, thus being poor in cracking resistance or brittleness.

The solution containing the cyclic olefin addition polymer of high gas permeability of the invention may be formulated with known antioxidants so as to improve oxidation stability.

Examples of the antioxidant include phenolic or hydroquinone compounds such as 2,6-di-t-butyl-4-methylphenol, 4,4'-thiobis-(6-t-butyl-3-methylphenol), 1,1'-bis-(4-hydroxyphenyl)cyclohexane, 2,5-di-t-butylhydroquinone, pentaerythrityl-tetrakis[3-(3,5-di-t-butyl-4-hydroxyphenyl)]-propionate and the like, phosphorus compounds such as tris (4-methoxy-3,5-diphenyl)phosphite, tris(nonylphenyl)phosphite, tris(2,4-di-t-butylphenyl)phosphite, bis(2,4-di-t-butylphenyl)pentaerythritol diphosphate and the like, and thio ether compound and lactone compounds. Of these compounds, those having a decomposition temperature (i.e., a temperature at which a weight loss is 5%) of not lower than 250° C. are preferred. The amount of the antioxidant is within a range of 0.05 to 5.0 parts by weight per 100 parts by weight of the cyclic olefin addition polymer of the invention.

EXAMPLES

The invention is described in more detail by way of Examples and Comparative Examples and the invention should not be construed as limited to the Examples. It will be noted that in the following formulas, Me represents a methyl group, Ph represents a phenyl group, and Cy represents a cyclohexyl group, respectively.

The molecular weight of polymer, molecular weight distribution, compositional ratio of monomers, solubility, glass transition temperature, breaking strength, elongation at break, and oxygen permeation coefficient were, correspondingly, evaluated according to the following methods.

1) The weight average molecular weight (Mw), number average molecular weight (Mn) and molecular weight distribution (Mw/Mn) of polymers obtained in the examples were obtained by GPC using THF as a solvent and also using polystyrene as a reference substance.
2) The compositional ratio of norbornene derivative/norbornene in copolymers was obtained from an integration ratio of peaks obtained from ¹H-NMR.
3) The solubility in an organic solvent was evaluated by preparing a 10 wt % solution by use of a solvent including isododecane, methyltris(trimethylsiloxy)silane (hereinafter abbreviated as M₃T) or decamethylcyclopentasiloxane (hereinafter abbreviated as D₅).
4) The glass transition temperature was measured by use of a TMA apparatus wherein a sample having a film thickness of 100 μm, a width of 3 mm and a length of 20 mm was fixed to a probe and was raised from room temperature at a rate of 10° C./minute.

5) The breaking strength and elongation at break were measured by punching a 100 μm thick film into a No. 2 dumbbell form, fixing it to a probe of a tester and pulling at a rate of 50 mm/minute.

6) The oxygen permeation coefficient was measured according to a differential-pressure method using a disk sample having a film thickness of 50 μm and a diameter of 4 cm.

Example 1

0.0115 g ($2.0 \times 10^{-5}$ moles) of bis(dibenzylideneacetone)-palladium [Pd($C_{17}H_{14}O$)$_2$], 0.0184 g ($2.0 \times 10^{-5}$ moles) of triphenylcarbenium tetrakis(pentafluorophenyl)borate {[Ph$_3$C][B($C_6F_5$)$_4$]} and 0.0056 g ($2.0 \times 10^{-5}$ moles) of tricyclohexyl phosphine (PCy$_3$) were, correspondingly, dissolved in 10 ml of toluene to prepare a $2.00 \times 10^{-6}$ moles/ml solution. 5.210 g ($13.4 \times 10^{-3}$ moles) of monomer A represented by the following formula (6) and 0.527 g ($5.6 \times 10^{-3}$ moles) of monomer B (norbornene) represented by the following formula (7) were dissolved in 5 ml of toluene in an argon-purged glass container. 1 ml of each of the $2.00 \times 10^{-6}$ moles/ml catalyst solutions was added to the resulting monomer solution, followed by polymerization reaction at room temperature (21° C.) for 20 hours.

After completion of the reaction, the resulting polymer was precipitated by pouring into a large amount of methanol, followed by removal by filtration, washing and drying under reduced pressure at 120° C. for six hours to obtain 0.63 g (yield 11%) of polymer P(1).

When measured by GPC, the molecular weight of the thus obtained polymer P(1) was Mn=805,000 with a molecular weight distribution of Mw/Mn=1.67. $^1$H-NMR spectra revealed that a compositional ratio of the monomer A-derived structure and the monomer B-derived structure was A/B=40/60 (mole/mole).

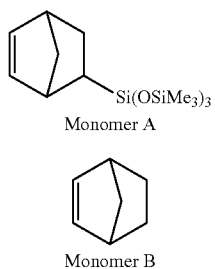

Monomer A (6)

Monomer B (7)

Example 2

In the same manner as in Example 1 except that the reaction temperature was set at 30° C., the polymerization reaction was carried out.

After completion of the reaction, the resulting polymer was precipitated by pouring into a large amount of methanol, followed by removal by filtration, washing and drying under reduced pressure at 120° C. for six hours to obtain 3.84 g (yield 67%) of polymer P(2).

When measured by GPC, the molecular weight of the thus obtained polymer P(2) was Mn=744,000 with a molecular weight distribution of Mw/Mn=1.35. $^1$H-NMR spectra revealed that a compositional ratio of the monomer A-derived structure and the monomer B-derived structure was A/B=60/40 (mole/mole).

Example 3

In the same manner as in Example 1 except that the reaction temperature was set at 40° C., the polymerization reaction was carried out.

After completion of the reaction, the resulting polymer was precipitated by pouring into a large amount of methanol, followed by removal by filtration, washing and drying under reduced pressure at 120° C. for six hours to obtain 3.61 g (yield 63%) of polymer P(3).

When measured by GPC, the molecular weight of the thus obtained polymer P(3) was Mn=699,000 with a molecular weight distribution of Mw/Mn=1.54. $^1$H-NMR spectra revealed that a compositional ratio of the monomer A-derived structure and the monomer B-derived structure was A/B=52/48 (mole/mole).

Example 4

In the same manner as in Example 1 except that the reaction temperature was set at 50° C., the polymerization reaction was carried out.

After completion of the reaction, the resulting polymer was precipitated by pouring into a large amount of methanol, followed by removal by filtration, washing and drying under reduced pressure at 120° C. for six hours to obtain 4.36 g (yield 76%) of polymer P(4).

When measured by GPC, the molecular weight of the thus obtained polymer P(4) was Mn=522,000 with a molecular weight distribution of Mw/Mn=1.76. $^1$H-NMR spectra revealed that a compositional ratio of the monomer A-derived structure and the monomer B-derived structure was A/B=65/35 (mole/mole).

Example 5

In the same manner as in Example 1 except that the reaction temperature was set at 70° C., the polymerization reaction was carried out.

After completion of the reaction, the resulting polymer was precipitated by pouring into a large amount of methanol, followed by removal by filtration, washing and drying under reduced pressure at 120° C. for six hours to obtain 4.41 g (yield 77%) of polymer P(5).

When measured by GPC, the molecular weight of the thus obtained polymer P(5) was Mn=285,000 with a molecular weight distribution of Mw/Mn=2.51. $^1$H-NMR spectra revealed that a compositional ratio of the monomer A-derived structure and the monomer B-derived structure was A/B=60/40 (mole/mole).

Figure 2:
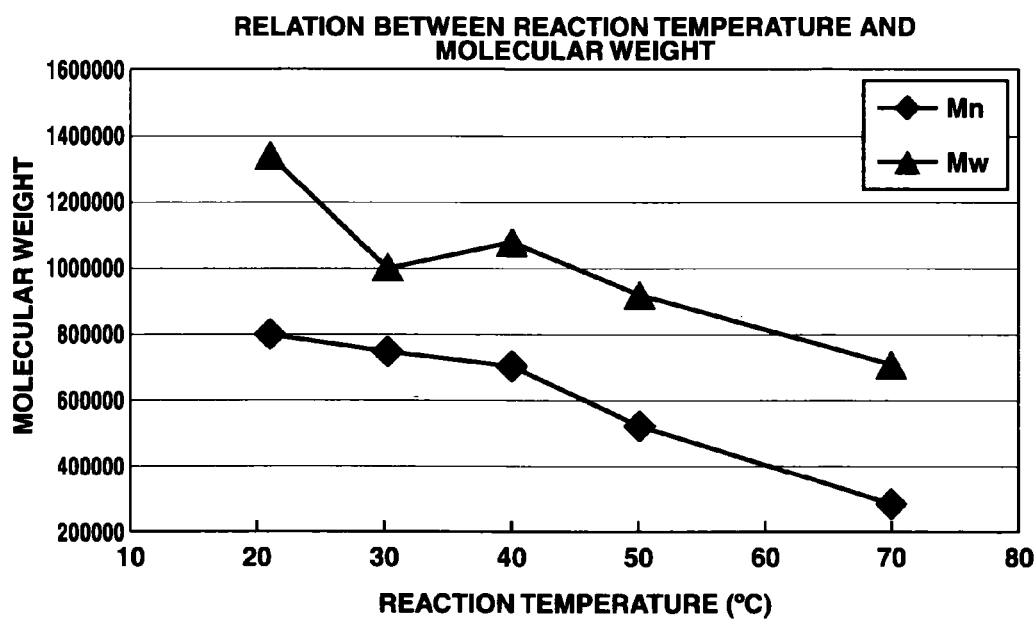
FIG. 2 is a graph showing the relation between the reaction temperature and the molecular weight for the polymers obtained in Examples 1 to 5.
Figure 3:
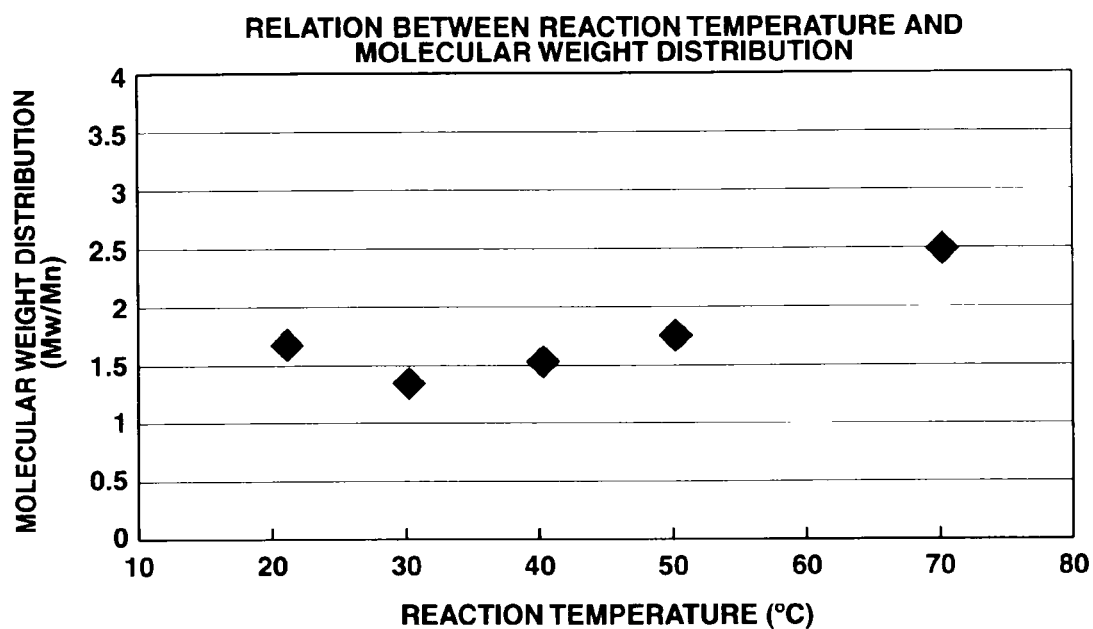
FIG. 3 is a graph showing the relation between the reaction temperature and the molecular weight distribution for the polymers obtained in Examples 1 to 5.

The results of Examples 1 to 5 are shown in Table 1. FIGS. 1 to 3 show the relations between the yield, molecular weight and molecular weight distribution of the polymers obtained in Examples 1 to 5 and the reaction temperature.

TABLE 1

| Example (Polymer) | Reaction temperature (°C.) | Yield (%) | Number average molecular weight (Mn) | Weight average molecular weight (Mw) | Molecular weight distribution (Mw/Mn) | Polymer composition (A/B: molar ratio) |
|---|---|---|---|---|---|---|
| 1 P(1) | 21 | 11 | 805,000 | 1,341,000 | 1.67 | 40/60 |
| 2 P(2) | 30 | 67 | 744,000 | 1,004,000 | 1.35 | 60/40 |
| 3 P(3) | 40 | 63 | 699,000 | 1,076,000 | 1.54 | 52/48 |
| 4 P(4) | 50 | 76 | 522,000 | 919,000 | 1.76 | 65/35 |
| 5 P(5) | 70 | 77 | 285,000 | 715,000 | 2.51 | 60/40 |

Example 6

12.6 g (0.04 moles) of monomer C represented by the following formula (8) was dissolved in 25 ml of toluene in a nitrogen-purged glass container.

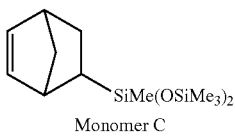

(8)

Monomer C

A separately prepared catalyst solution (i.e. a solution dissolving, in 15 ml of toluene, 0.0115 g ($2.0 \times 10^{-5}$ moles) of bis(dibenzylideneacetone)palladium [$Pd(C_{17}H_{14}O)_2$], 0.0184 g ($2.0 \times 10^{-5}$ moles) of triphenylcarbenium tetrakis (pentafluorophenyl)borate {$[Ph_3C][B(C_6F_5)_4]$} and 0.0056 g ($2.0 \times 10^{-5}$ moles) of tricyclohexyl phosphine ($PCy_3$)) was added to the monomer solution, followed by polymerization reaction at 30° C. for two hours.

After completion of the reaction, the resulting polymer was precipitated by pouring into a large amount of methanol, followed by removal by filtration, washing and drying under reduced pressure at 120° C. for six hours to obtain 6.30 g (yield 50%) of polymer P(6).

When measured by GPC, the molecular weight of the thus obtained polymer P(6) was Mn=935,000 with a molecular weight distribution of Mw/Mn=1.77.

Example 7

In the same manner as in Example 6 except that the reaction temperature was set at 60° C. and the reaction time was set at one hour, the polymerization reaction was carried out.

After completion of the reaction, the resulting polymer was precipitated by pouring into a large amount of methanol, followed by removal by filtration, washing and drying under reduced pressure at 120° C. for six hours to obtain 6.05 g (yield 48%) of polymer P(7).

When measured by GPC, the molecular weight of the thus obtained polymer P(7) was Mn=405,000, with a molecular weight distribution of Mw/Mn=1.42.

Comparative Example 1

In the same manner as in Example 6 except that $2.0 \times 10^{-5}$ moles of cyclopentadienyl(allyl)palladium [$C_5H_6PdC_3H_5$] that is a divalent palladium complex was used in place of bis(dibenzylideneacetone)palladium, the polymerization reaction was carried out.

After completion of the reaction, the resulting polymer was precipitated by pouring into a large amount of methanol, followed by removal by filtration, washing and drying under reduced pressure at 120° C. for six hours to obtain 6.55 g (yield 52%) of polymer P(8).

When measured by GPC, the molecular weight of the thus obtained polymer P(8) was Mn=632,000, with a molecular weight distribution of Mw/Mn=1.40.

Comparative Example 2

In the same manner as in Comparative Example 1 except that the reaction was set at 60° C. and the reaction time was set at one hour, the polymerization reaction was carried out.

After completion of the reaction, the resulting polymer was precipitated by pouring into a large amount of methanol, followed by removal by filtration, washing and drying under reduced pressure at 120° C. for six hours to obtain 6.67 g (yield 53%) of polymer P(9).

When measured by GPC, the molecular weight of the thus obtained polymer P(9) was Mn=641,000, with a molecular weight distribution of Mw/Mn=1.41.

Comparative Example 3

In the same manner as in Example 6 except that $2.0 \times 10^{-5}$ moles of bis(acetylacetonate)palladium [$Pd(C_5H_7O_2)_2$] that is a divalent palladium complex was used in place of bis (dibenzylideneacetone)palladium, the polymerization reaction was carried out.

After completion of the reaction, the resulting polymer was precipitated by pouring into a large amount of methanol, followed by removal by filtration, washing and drying under reduced pressure at 120° C. for six hours to obtain 6.30 g (yield 50%) of polymer P(10).

When measured by GPC, the molecular weight of the thus obtained polymer P(10) was Mn=1,350,000, with a molecular weight distribution of Mw/Mn=1.50.

Comparative Example 4

In the same manner as in Comparative Example 3 except that the reaction was set at 60° C. and the reaction time was set at one hour, the polymerization reaction was carried out.

After completion of the reaction, the resulting polymer was precipitated by pouring into a large amount of methanol, followed by removal by filtration, washing and drying under reduced pressure at 120° C. for six hours to obtain 5.80 g (yield 46%) of polymer P(11).

When measured by GPC, the molecular weight of the thus obtained polymer P(11) was Mn=1,450,000, with a molecular weight distribution of Mw/Mn=1.57.

Figure 4:
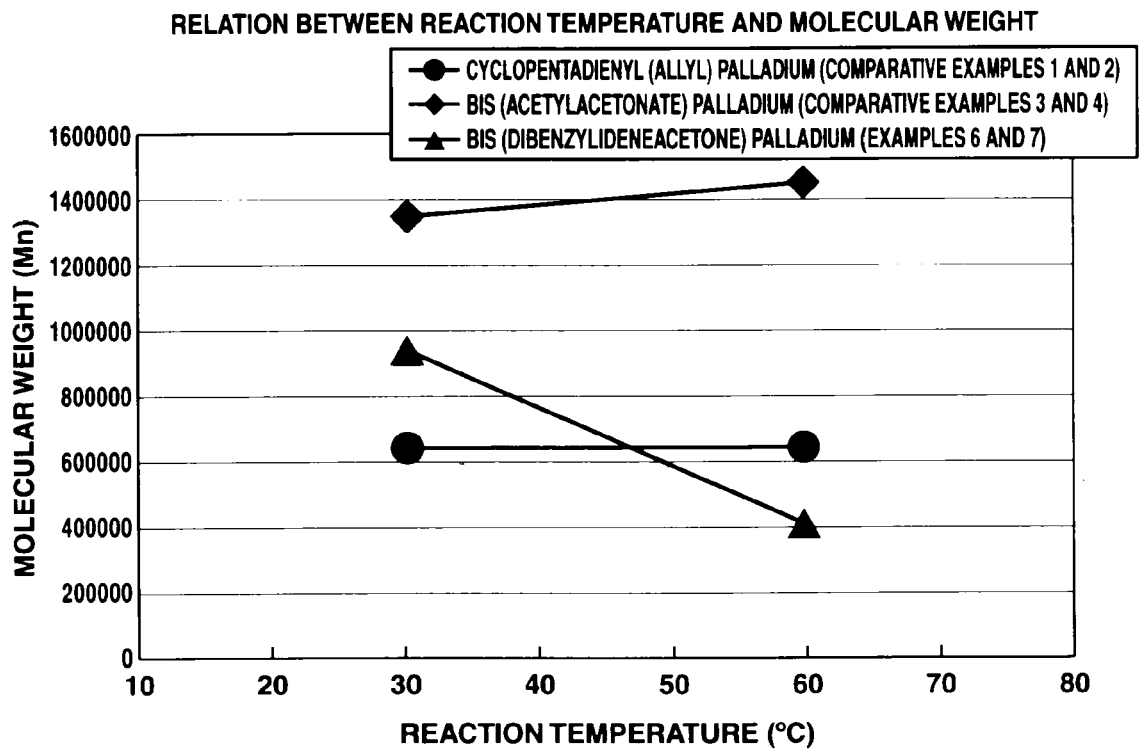
FIG. 4 is a graph showing the relation between the reaction temperature and the yield for the polymers obtained in Examples 6, 7 and Comparative Examples 1 to 4.
Figure 6:
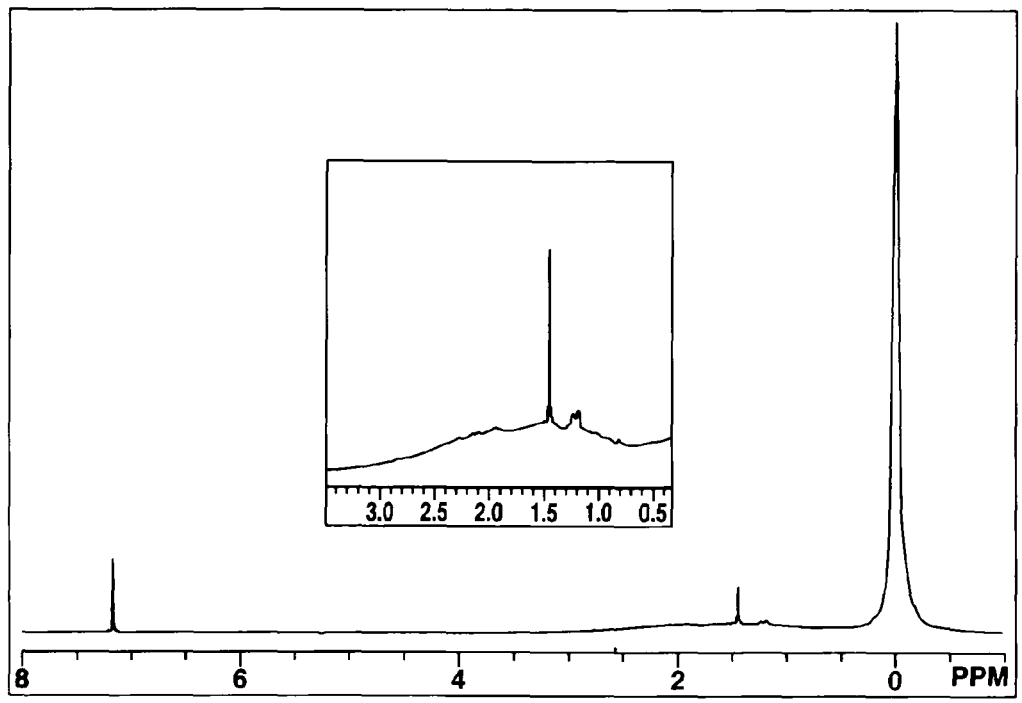
FIG. 6 is a $^1$H-NMR chart of polymer P (7) obtained in Example 7.
Figure 7:
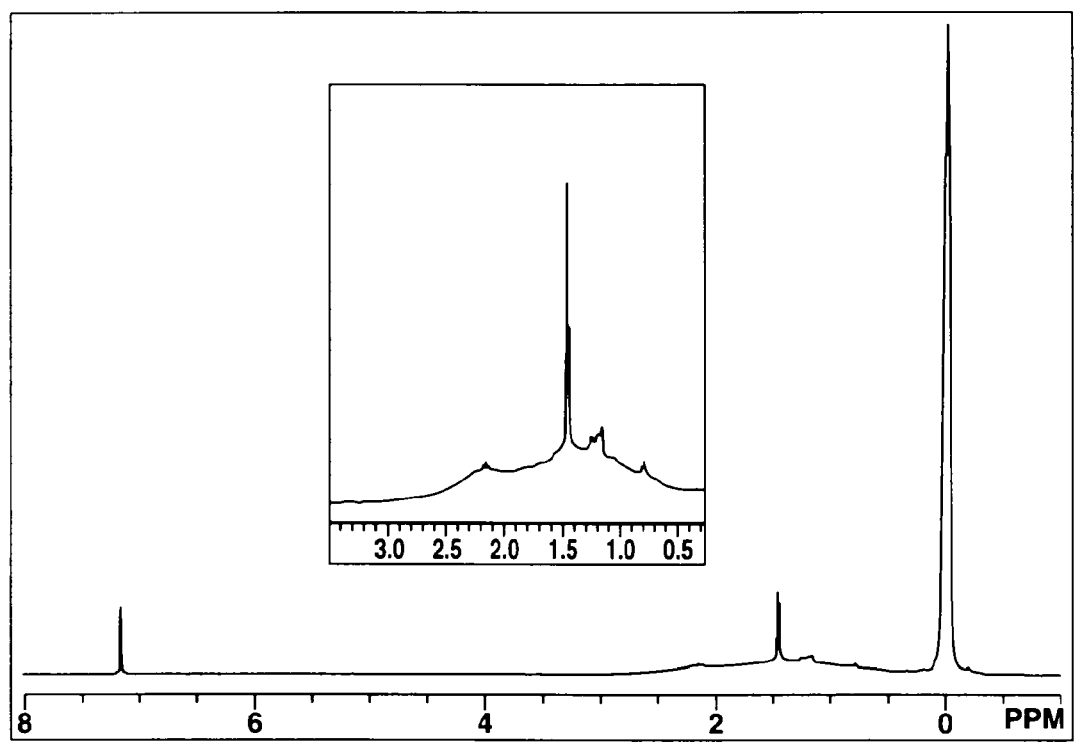
FIG. 7 is a $^1$H-NMR chart of polymer P (14) obtained in Example 10.

The results of Examples 6, 7 and Comparative Examples 1 to 4 are shown in Table 2. In FIG. 4, there is shown the relation between the molecular weight of the polymers obtained in Examples 6, 7 and Comparative Examples 1 to 4 and the reaction temperature. In FIG. 6, there is shown an $^1$H-NMR chart of the polymer P(7) obtained in Example 7.

TABLE 2

| Example (Polymer) | Reaction temperature (° C.) | Yield (%) | Number average molecular weight (Mn) | Weight average molecular weight (Mw) | Molecular weight distribution (Mw/Mn) |
|---|---|---|---|---|---|
| 6 P(6) | 30 | 50 | 935,000 | 1,655,000 | 1.77 |
| 7 P(7) | 60 | 48 | 405,000 | 575,000 | 1.42 |

| Comparative Example (Polymer) | Reaction temperature (° C.) | Yield (%) | Number average molecular weight (Mn) | Weight average molecular weight (Mw) | Molecular weight distribution (Mw/Mn) |
|---|---|---|---|---|---|
| 1 P(8) | 30 | 52 | 632,000 | 885,000 | 1.40 |
| 2 P(9) | 60 | 53 | 641,000 | 904,000 | 1.41 |
| 3 P(10) | 30 | 50 | 1,350,000 | 2,025,000 | 1.50 |
| 4 P(11) | 60 | 46 | 1,450,000 | 2,276,000 | 1.57 |

Example 8

202.4 g (0.52 moles) of monomer A represented by the afore-indicated formula (6) and 26.4 g (0.28 moles) of monomer B (norbornene) represented by the afore-indicated formula (7) were dissolved in 450 ml of toluene in a nitrogen-purged glass container. A separately prepared catalyst solution (i.e., a solution dissolving, in 15 ml of toluene, 0.0115 g (2.0×10$^{-5}$ moles) of bis(dibenzylideneacetone)palladium [Pd(C$_{17}$H$_{14}$O)$_2$], 0.0184 g (2.0×10$^{-5}$ moles) of triphenylcarbenium tetrakis(pentafluorophenyl)borate {[Ph$_3$C][B(C$_6$F$_5$)$_4$]} and 0.0056 g (2.0×10$^{-5}$ moles) of tricyclohexyl phosphine (PCy$_3$)) was added to the monomer solution, followed by polymerization reaction at 40° C. for ten hours.

After completion of the reaction, the resulting polymer was precipitated by pouring into a large amount of methanol, followed by removal by filtration, washing and drying under reduced pressure at 120° C. for 12 hours to obtain 153.3 g (yield 67%) of polymer P(12).

When measured by GPC, the molecular weight of the thus obtained polymer P(12) was Mn=815,000 with a molecular weight distribution of Mw/Mn=2.04. $^1$H-NMR spectra revealed that a compositional ratio between the monomer A-derived structure and the monomer B-derived structure was A/B=65/35 (mole/mole).

Example 9

In the same manner as in Example 8 except that the reaction temperature was set at 50° C., the polymerization reaction was carried out.

After completion of the reaction, the resulting polymer was precipitated by pouring into a large amount of methanol, followed by removal by filtration, washing and drying under reduced pressure at 120° C. for 12 hours to obtain 151.0 g (yield 66%) of polymer P(13).

When measured by GPC, the molecular weight of the thus obtained polymer P(13) was Mn=601,000, with a molecular weight distribution of Mw/Mn=2.41. $^1$H-NMR spectra revealed that a compositional ratio between the monomer A-derived structure and the monomer B-derived structure was A/B=64/36 (mole/mole).

Example 10

In the same manner as in Example 8 except that the reaction temperature was set at 60° C., the polymerization reaction was carried out.

After completion of the reaction, the resulting polymer was precipitated by pouring into a large amount of methanol, followed by removal by filtration, washing and drying under reduced pressure at 120° C. for 12 hours to obtain 155.6 g (yield 68%) of polymer P(14).

When measured by GPC, the molecular weight of the thus obtained polymer P(14) was Mn=351,000, with a molecular weight distribution of Mw/Mn=3.86. $^1$H-NMR spectra revealed that a compositional ratio between the monomer A-derived structure and the monomer B-derived structure was A/B=63/37 (mole/mole).

Example 11

In the same manner as in Example 8 except that the reaction temperature was set at 80° C., the polymerization reaction was carried out.

After completion of the reaction, the resulting polymer was precipitated by pouring into a large amount of methanol, followed by removal by filtration, washing and drying under reduced pressure at 120° C. for 12 hours to obtain 157.9 g (yield 69%) of polymer P(15).

When measured by GPC, the molecular weight of the thus obtained polymer P(15) was Mn=225,000, with a molecular weight distribution of Mw/Mn=3.78. $^1$H-NMR spectra revealed that a compositional ratio between the monomer A-derived structure and the monomer B-derived structure was A/B=64/36 (mole/mole).

Example 12

In the same manner as in Example 8 except that the reaction temperature was set at 95° C., the polymerization reaction was carried out.

After completion of the reaction, the resulting polymer was precipitated by pouring into a large amount of methanol, followed by removal by filtration, washing and drying under reduced pressure at 120° C. for 12 hours to obtain 152.9 g (yield 67%) of polymer P(16).

When measured by GPC, the molecular weight of the thus obtained polymer P(16) was Mn=162,000, with a molecular weight distribution of Mw/Mn=4.11. $^1$H-NMR spectra revealed that a compositional ratio between the monomer A-derived structure and the monomer B-derived structure was A/B=65/35 (mole/mole).

Example 13

404.8 g (1.04 moles) of monomer A represented by the afore-indicated formula (6) and 52.8 g (0.56 moles) of monomer B (norbornene) represented by the afore-indicated formula (7) were dissolved in 900 ml of toluene in a nitrogen-purged glass container. A separately prepared catalyst solution (i.e., a solution dissolving, in 15 ml of toluene, 0.0115 g ($2.0×10^{-5}$ moles) of bis(dibenzylideneacetone)palladium [$Pd(C_{17}H_{14}O)_2$], 0.0184 g ($2.0×10^{-5}$ moles) of triphenylcarbenium tetrakis(pentafluorophenyl)borate {$[Ph_3C][B(C_6F_5)_4]$} and 0.0056 g ($2.0×10^{-5}$ moles) of tricyclohexyl phosphine ($PCy_3$)) was added to the monomer solution, followed by polymerization reaction at 55° C. for ten hours.

After completion of the reaction, the resulting polymer was precipitated by pouring into a large amount of methanol, followed by removal by filtration, washing and drying under reduced pressure at 120° C. for 12 hours to obtain 311.2 g (yield 68%) of polymer P(17).

When measured by GPC, the molecular weight of the thus obtained polymer P(17) was Mn=564,000 with a molecular weight distribution of Mw/Mn=2.43. $^1$H-NMR spectra revealed that a compositional ratio between the monomer A-derived structure and the monomer B-derived structure was A/B=63/37 (mole/mole).

Comparative Example 5

In the same manner as in Example 10 except that $2.0×10^{-5}$ moles of cyclopentadienyl(allyl)palladium [$C_5H_6PdC_3H_5$] that is a divalent palladium complex was used in place of bis(dibenzylideneacetone)palladium, the polymerization reaction was carried out.

After completion of the reaction, the resulting polymer was precipitated by pouring into a large amount of methanol, followed by removal by filtration, washing and drying under reduced pressure at 120° C. for 12 hours to obtain 153.3 g (yield 67%) of polymer P(18).

When measured by GPC, the molecular weight of the thus obtained polymer P(18) was Mn=569,000, with a molecular weight distribution of Mw/Mn=3.05. $^1$H-NMR spectra revealed that a compositional ratio between the monomer A-derived structure and the monomer B-derived structure was A/B=65/35 (mole/mole).

Comparative Example 6

In the same manner as in Example 10 except that $2.0×10^{-5}$ moles of bis(acetylacetonate)palladium [$Pd(C_5H_7O_2)_2$] that is a divalent palladium complex was used in place of bis (dibenzylideneacetone)palladium, the polymerization reaction was carried out.

After completion of the reaction, the resulting polymer was precipitated by pouring into a large amount of methanol, followed by removal by filtration, washing and drying under reduced pressure at 120° C. for 12 hours to obtain 157.9 g (yield 69%) of polymer P(19).

When measured by GPC, the molecular weight of the thus obtained polymer P(19) was Mn=765,000, with a molecular weight distribution of Mw/Mn=2.81. When measured by GPC, the molecular weight of the thus obtained polymer P(19) was Mn=765,000 with a molecular weight distribution of Mw/Mn=2.81. $^1$H-NMR spectra revealed that a compositional ratio between the monomer A-derived structure and the monomer B-derived structure was A/B=65/35 (mole/mole).

Figure 5:
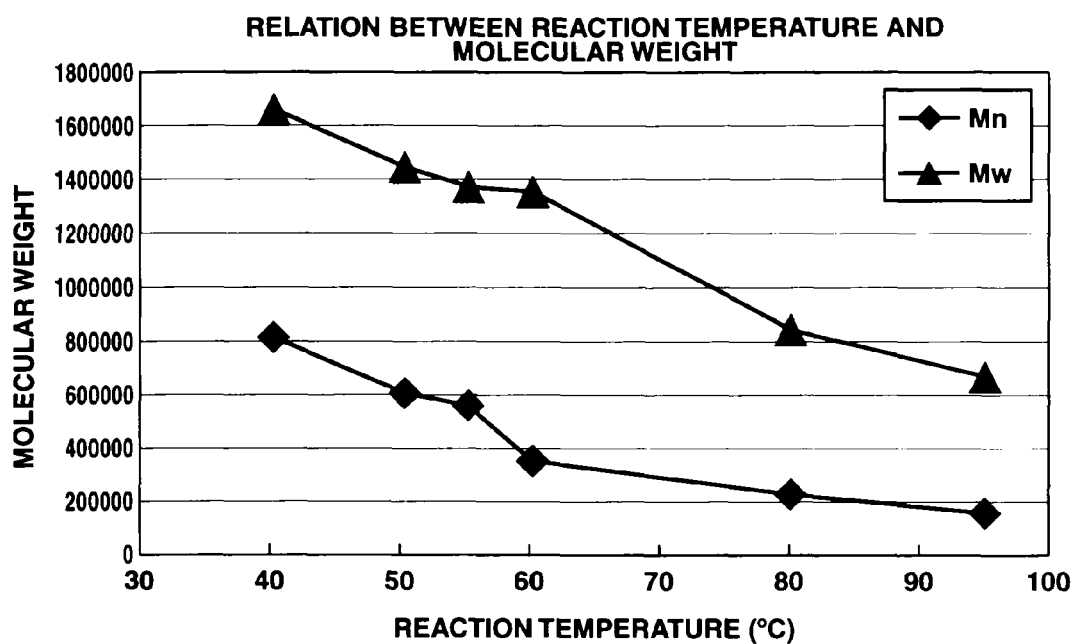
FIG. 5 is a graph showing the relation between the reaction temperature and the yield for the polymers obtained in Examples 8 to 13.

The results of Examples 8 to 13 and Comparative Examples 5, 6 are shown in Table 3. FIG. 5 shows the relation between the reaction temperature and the molecular weight of the respective polymers obtained in Examples 8 to 13.

TABLE 3

| Example (Polymer) | Reaction temperature (° C.) | Yield (%) | Number average molecular weight (Mn) | Weight average molecular weight (Mw) | Molecular weight distribution (Mw/Mn) | Polymer composition (A/B: molar ratio) |
|---|---|---|---|---|---|---|
| 8 P(12) | 40 | 67 | 815,000 | 1,663,000 | 2.04 | 65/35 |
| 9 P(13) | 50 | 66 | 601,000 | 1,448,000 | 2.41 | 64/36 |
| 10 P(14) | 60 | 68 | 351,000 | 1,355,000 | 3.86 | 63/37 |
| 11 P(15) | 80 | 69 | 225,000 | 851,000 | 3.78 | 64/36 |
| 12 P(16) | 95 | 67 | 162,000 | 665,000 | 4.11 | 65/35 |
| 13 P(17) | 55 | 68 | 564,000 | 1,371,000 | 2.43 | 63/37 |

| Comparative Example (Polymer) | Reaction temperature (° C.) | Yield (%) | Number average molecular weight (Mn) | Weight average molecular weight (Mw) | Molecular weight distribution (Mw/Mn) | Polymer composition (A/B: molar ratio) |
|---|---|---|---|---|---|---|
| 5 P(18) | 60 | 67 | 569,000 | 1,735,000 | 3.05 | 65/35 |
| 6 P(19) | 60 | 69 | 765,000 | 2,150,000 | 2.81 | 65/35 |

Example 14

A solution, dissolved in 15 ml of toluene, of 0.0115 g ($2.0×10^{-5}$ moles) of bis(dibenzylideneacetone)palladium [$Pd(C_{17}H_{14}O)_2$], 0.0184 g ($2.0×10^{-5}$ moles) of triphenylcarbenium tetrakis(pentafluorophenyl)borate {$[Ph_3C][B(C_6F_5)_4]$} and 0.0056 g ($2.0×10^{-5}$ moles) of tricyclohexyl phosphine ($PCy_3$) was tightly sealed and allowed to stand over one week.

Next, 12.6 g (0.04 moles) of monomer C represented by the foregoing formula (8) was dissolved in 25 ml of toluene in a nitrogen-purged glass container, to which the catalyst solution, allowed to stand over one week, was added, followed by polymerization reaction at 60° C. for one hour.

After completion of the reaction, the resulting polymer was precipitated by pouring into a large amount of methanol, followed by removal by filtration, washing and drying under reduced pressure at 120° C. for six hours to obtain 6.05 g (yield 48%) of polymer P(20).

When measured by GPC, the molecular weight of the thus obtained polymer P(20) was Mn=485,000 with a molecular weight distribution of Mw/Mn=1.51.

The results of Example 14 are shown in Table 4 along with those of Example 7.

TABLE 4

| Example (Polymer) | Reaction temperature (° C.) | Yield (%) | Number average molecular weight (Mn) | Weight average molecular weight (Mw) | Molecular weight distribution (Mw/Mn) |
|---|---|---|---|---|---|
| 7 P(7) | 60 | 48 | 405,000 | 575,000 | 1.42 |
| 14 P(20) | 60 | 48 | 485,000 | 732,000 | 1.51 |

Comparative Example 7

In the same manner as in Example 10 except that $2.0 \times 10^{-5}$ moles of bis(acetylacetonato)palladium [$Pd(C_5H_7O_2)_2$] that is a divalent palladium complex was used in place of bis(dibenzylideneacetone)palladium and 0.67 g (6 mmoles) of 1-octene was used as a molecular weight controlling agent, the polymerization reaction was carried out.

After completion of the reaction, the resulting polymer was precipitated by pouring into a large amount of methanol, followed by removal by filtration, washing and drying under reduced pressure at 120° C. for 12 hours to obtain 157.9 g (yield 69%) of polymer P(21).

When measured by GPC, the molecular weight of the thus obtained polymer P(21) was Mn=379,000, with a molecular weight distribution of Mw/Mn=3.69. $^1$H-NMR spectra revealed that a compositional ratio between the monomer A-derived structure and the monomer B-derived structure was A/B=65/35 (mole/mole).

The results of Comparative Example 7 were shown in Table 5 along with those of Examples 8, 10 and Comparative Example 6.

From the above results, the following will be seen.

1) When using a multi-component catalyst containing the compounds (A), (B) and (C) for the preparation of a cyclic olefin addition polymer of the invention, the molecular weight of the resulting polymer can be controlled depending on the reaction temperature.
2) The capability of the multi-component catalyst containing the compounds (A), (B) and (C) of controlling the molecular weight of the polymer depending on the reaction temperature is maintained when changing the structure of a cyclic olefin-functional siloxane monomer used and its charge ratio. On the other hand, when using existing divalent palladium complexes, such a capability is not found.
3) The multi-component catalyst containing the compounds (A), (B) and (C) has such a high polymerization activity as existing divalent palladium complexes.
4) The multi-component catalyst containing the compounds (A), (B) and (C) has high storage stability.
5) If divalent palladium complexes are used, a large amount of a molecular weight controlling agent is needed so as to appropriately control the molecular weight. On the other hand, when using a zero-valent palladium complex, no molecular weight controlling agent is necessary.

More particularly, high superiority is confirmed for the preparation of a cyclic olefin addition polymer of the invention with respect to the use of a multi-component catalyst that has a specific type of structure made of the compounds (A), (B) and (C).

Example 15

In the same manner as in Example 8 except that $2.0 \times 10^{-5}$ moles of a lithium tetrakis(pentafluorophenyl)borate-ethyl ether complex was used, as an ionic boron compound, in place of triphenylcarbenium tetrakis(pentafluorophenyl)borate, the polymerization reaction was carried out.

After completion of the reaction, the resulting polymer was precipitated by pouring into a large amount of methanol, followed by removal by filtration, washing and drying under reduced pressure at 120° C. for 12 hours to obtain 148.7 g (yield 65%) of polymer P(22).

When measured by GPC, the molecular weight of the thus obtained polymer P(22) was Mn=396,000, with a molecular weight distribution of Mw/Mn=3.31. $^1$H-NMR spectra revealed that a compositional ratio between the monomer

TABLE 5

| Example (Polymer) | Molecular weight controlling agent | Reaction temperature (° C.) | Yield (%) | Number average molecular weight (Mn) | Weight average molecular weight (Mw) | Molecular weight distribution (Mw/Mn) | Polymer composition (A/B: molar ratio) |
|---|---|---|---|---|---|---|---|
| 8 P(12) | Nil | 40 | 67 | 815,000 | 1,663,000 | 2.04 | 65/35 |
| 10 P(14) | Nil | 60 | 68 | 351,000 | 1,355,000 | 3.86 | 63/37 |

| Comparative Example (Polymer) | Molecular weight controlling agent | Reaction temperature (° C.) | Yield (%) | Number average molecular weight (Mn) | Weight average molecular weight (Mw) | Molecular weight distribution (Mw/Mn) | Polymer composition (A/B: molar ratio) |
|---|---|---|---|---|---|---|---|
| 6 P(19) | Nil | 60 | 69 | 765,000 | 2,150,000 | 2.81 | 65/35 |
| 7 P(21) | 1-Octene | 60 | 69 | 379,000 | 1,399,000 | 3.69 | 65/35 |

A-derived structural product and the monomer B-derived structural product was A/B=57/43 (mole/mole).

Example 16

In the same manner as in Example 8 except that $2.0 \times 10^{-5}$ moles of tris(dibenzylideneacetone)dipalladium [Pd$_2$(C$_{17}$H$_{14}$O)$_3$] was used, as a zero-valent palladium complex, in place of bis(dibenzylideneacetone)palladium and the reaction temperature was set at 50° C. and the reaction time was set at 20 hours, the polymerization reaction was carried out.

After completion of the reaction, the resulting polymer was precipitated by pouring into a large amount of methanol, followed by removal by filtration, washing and drying under reduced pressure at 120° C. for 12 hours to obtain 146.5 g (yield 64%) of polymer P(23).

When measured by GPC, the molecular weight of the thus obtained polymer P(23) was Mn=372,000, with a molecular weight distribution of Mw/Mn=1.95. $^1$H-NMR spectra revealed that a compositional ratio between the monomer A-derived structure and the monomer B-derived structure was A/B=63/37 (mole/mole).

Example 17

In the same manner as in Example 16 except that the reaction temperature was set at 30° C., the polymerization reaction was carried out.

After completion of the reaction, the resulting polymer was precipitated by pouring into a large amount of methanol, followed by removal by filtration, washing and drying under reduced pressure at 120° C. for 12 hours to obtain 141.9 g (yield 62%) of polymer P(24).

When measured by GPC, the molecular weight of the thus obtained polymer P(24) was Mn=797,000, with a molecular weight distribution of Mw/Mn=1.41. $^1$H-NMR spectra revealed that a compositional ratio between the monomer A-derived structure and the monomer B-derived structure was A/B=51/49 (mole/mole).

Comparative Example 8

55.2 g (0.142 moles) of monomer A represented by the afore-indicated formula (6) and 3.3 g (0.035 moles) of monomer B (norbornene) represented by the afore-indicated formula (7) were dissolved in 240 ml of toluene in a nitrogen-purged glass container. A separately prepared catalyst solution (i.e. a solution dissolving, in 15 ml of toluene, 23 mg (89 μmoles) of bis(acetylacetate)nickel [Ni(acac)$_2$] and 228 mg (445 μmoles) of tris(pentafluoro-phenyl)boron [B(C$_6$F$_5$)$_3$]) was added to the monomer solution, followed by polymerization reaction at 60° C. for 24 hours.

After completion of the reaction, the resulting polymer was precipitated by pouring into a large amount of methanol, followed by removal by filtration, washing and drying under reduced pressure at 120° C. for 12 hours to obtain 21.6 g (yield 37%) of polymer P(25).

When measured by GPC, the molecular weight of the thus obtained polymer P(25) was Mn=46,000 with a molecular weight distribution of Mw/Mn=2.05. $^1$H-NMR spectra revealed that a compositional ratio between the monomer A-derived structure and the monomer B-derived structure was A/B=73/27 (mole/mole).

Comparative Example 9

7.0 g (0.018 moles) of monomer A represented by the afore-indicated formula (6) and 14.9 g (0.159 moles) of monomer B (norbornene) represented by the afore-indicated formula (7) were dissolved in 140 ml of toluene in a nitrogen-purged glass container. A separately prepared catalyst solution (i.e. a solution dissolving, in 15 ml of toluene, 23 mg (89 μmoles) of bis(acetylacetate)nickel [Ni(acac)$_2$] and 228 mg (445 μmoles) of tris(pentafluoro-phenyl)boron [B(C$_6$F$_5$)$_3$]) was added to the monomer solution, followed by polymerization reaction at 25° C. for two hours.

After completion of the reaction, the resulting polymer was precipitated by pouring into a large amount of methanol, followed by removal by filtration, washing and drying under reduced pressure at 120° C. for six hours to obtain 16.2 g (yield 74%) of polymer P(26).

When measured by GPC, the molecular weight of the thus obtained polymer P(26) was Mn=253,000 with a molecular weight distribution of Mw/Mn=2.25. $^1$H-NMR spectra revealed that a compositional ratio between the monomer A-derived structure and the monomer B-derived structure was A/B=8/92 (mole/mole).

Table 6, there are shown solubilities of P(7) and P(14) of Examples 7, 10 and P(25) and P(26) of Comparative Examples 8, 9, respectively.

TABLE 6

| | | Solubility (10 wt % solution) | | |
|---|---|---|---|---|
| | Polymer | Isododecane | M$_3$T | D$_5$ |
| Example 7 | P(7) | ○ | ○ | ○ |
| Example 10 | P(14) | ○ | ○ | ○ |
| Comparative Example 8 | P(25) | ○ | ○ | ○ |
| Comparative Example 9 | P(26) | X | X | X |

○: Dissolved, Δ: Partially dissolved, X: Insoluble

Polysiloxane Solvent

| M$_3$T: | Methyltris(trimethylsiloxy)silane |
|---|---|
| D$_5$: | Decamethylcyclopentasiloxane |

The polymers P(7), P(14), P(25) and P(26) were each dissolved in toluene to make a 10 wt % polymer solution. These solutions were subjected to film formation according to a solution casting method, followed by drying at 60° C. for 24 hours to prepare polymer films F(7), F(14), F(25) and F(26). The results of the respective evaluations of the thus prepared films are shown in Table 7.

TABLE 7

| | Film | Glass transition temperature (° C.) | Breaking strength (Mpa) | Elongation at break (%) | Oxygen permeation coefficient (Barrer) |
|---|---|---|---|---|---|
| Example 7 | F(7) | 280 | 25 | 15 | 310 |
| Example 10 | F(14) | 310 | 21 | 4 | 350 |
| Comparative Example 8 | F(25) | Film was too fragile for measurements. | | | |
| Comparative Example 9 | F(26) | 352 | 58 | <1 | 34 |

1 Barrer: $10^{-10}$ cm$^3$(STP)·cm/cm$^2$·second·cmHg

From the above results, it will be seen that the cyclic olefin addition polymers of the invention having an organosiloxane as a pendant are excellent in all of solubility, film-forming property, gas permeability, heat resistance and mechanical strength and can be readily prepared by use of a multi-component catalyst of a specific type of structure.

The cyclic olefin addition polymer of high gas permeability according to the invention is excellent in film-forming property and has excellent gas permeability, heat resistance and mechanical strength. The polymer of the invention will be expected to be applied as an oxygen-enriching film for air conditioners and fuel cells and also as a contact lens. Moreover, the polymer of the invention has excellent solubility in organic solvents and polysiloxane solvents, so that applications thereof to filming agents for medicines, foods and cosmetics can be expected.

The cyclic olefin addition polymer of high gas permeability according to the invention can be easily prepared by use of a multi-component catalyst of a specific type of structure having excellent polymerization activity, selectivity and molecular weight controllability.

Japanese Patent Application No. 2010-172689 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a cyclic olefin addition polymer having a high gas permeability and a number average molecular weight (Mn) of 100,000 to 2,000,000 as determined by gel permeation chromatography relative to polystyrene standards, comprising addition polymerizing a cyclic olefin-functional siloxane represented by the following formula (1), or a mixture of the cyclic olefin-functional siloxane of the formula (1) and a cyclic olefin compound represented by the following formula (2)

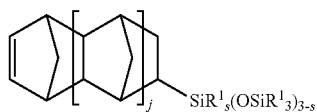
(1)

wherein $R^1$ may be the same or different and represents an aliphatic unsaturated bond-free monovalent organic group, s is an integer of 0 to 2 and j is 0 or 1,

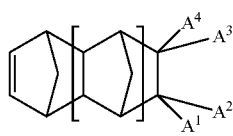
(2)

wherein $A^1$ to $A^4$ independently represent a group selected from a hydrogen atom, a halogen atom, an alkyl group having 1 to 10 carbon atoms, an alkenyl group, a cycloalkyl group, an aryl group, an alkoxy group, an aryloxy group and a halogenated hydrocarbon group, or a polar group selected from an oxetanyl group and an alkoxycarbonyl group provided that $A^1$ and $A^2$ or $A^1$ and $A^3$ may form a alicyclic structure, an aromatic ring structure, a carbonimide or an acid anhydride group along with the carbon atoms bonded therewith, and i is 0 or 1, in the presence of a multi-component catalyst containing (A) a zero-valent palladium compound, (B) an ionic boron compound, and (C) a phosphine compound having a substituent group selected from an alkyl group having 3 to 6 carbon atoms, a cycloalkyl group and an aryl group, thereby obtaining a cyclic olefin addition polymer wherein a ratio of the structural units derived from the cyclic olefin-functional siloxane of the formula (1) is at 10 to 100 mole % of the addition polymer.

2. The method according to claim 1, wherein the compound (A) is bis(dibenzylideneacetone)palladium that is a complex wherein two dibenzylideneacetone molecules are coordinated to one zero-valent palladium atom or tris(dibenzylideneacetone)dipalladium that is a complex wherein three dibenzylideneacetone molecules are coordinated to two zero-valent palladium atoms, the compound (B) is triphenylcarbeniumtetrakis(pentafluorophenyl)borate or lithium tetrakis(pentafluorophenyl)borate-ethyl ether complex, and the compound (C) is tricyclohexyl phosphine.

3. The method according to claim 1, wherein $R^1$ in the formula (1) is a methyl group.

4. The method according to claim 1, wherein $A^1$ to $A^4$ in the formula (2) independently represent a hydrogen atom and i is 0.

5. The method according to claim 1, wherein the addition polymerization is carried out in an atmosphere of an inert gas under conditions of 0 to 150° C. and one to 72 hours.

6. The method according to claim 1, wherein the compound (A) is used in an amount of 1/1000,000 to 1/100 mole, calculated as zero valent palladium, per mole of the total of the monomers of the formulas (1) and (2), the compound (B) is used in an amount of 1.0 to 2.0 moles per mole of the compound (A), and the compound (C) is used in an amount of 0.25 to 2.0 moles per mole of the compound (A).

7. The method according to claim 1, wherein the addition polymerization is carried out in a solvent wherein a ratio by weight between an amount S of the solvent and a total amount M of the cyclic olefin monomers consisting of the compounds of the formulas (1) and (2), indicated by S/M, is within a range of 0.1 to 30.

* * * * *